(12) United States Patent
Ireland et al.

(10) Patent No.: US 7,113,968 B1
(45) Date of Patent: Sep. 26, 2006

(54) METHOD AND APPARATUS FOR EFFICIENTLY PERFORMING GALOIS FIELD MULTIPLICATION

(75) Inventors: Howard H. Ireland, Woodstock, GA (US); Jeffrey T. Nichols, Marietta, GA (US)

(73) Assignee: CIENA Corporation, Linthicum, MD (US)

( * ) Notice: Subject to any disclaimer, the term of this patent is extended or adjusted under 35 U.S.C. 154(b) by 611 days.

(21) Appl. No.: 10/371,298

(22) Filed: Feb. 21, 2003

Related U.S. Application Data

(60) Provisional application No. 60/359,274, filed on Feb. 21, 2002.

(51) Int. Cl.
    *G06F 7/00* (2006.01)
(52) U.S. Cl. .................................................... 708/492
(58) Field of Classification Search ................. 708/492
    See application file for complete search history.

(56) References Cited

U.S. PATENT DOCUMENTS

| | | | | |
|---|---|---|---|---|
| 4,745,568 | A * | 5/1988 | Onyszchuk et al. | 708/492 |
| 5,272,661 | A * | 12/1993 | Raghavan et al. | 708/492 |
| 5,787,028 | A * | 7/1998 | Mullin | 708/492 |
| 6,178,436 | B1 * | 1/2001 | Blake et al. | 708/492 |
| 6,343,305 | B1 * | 1/2002 | Ko.cedilla. et al. | 708/492 |

\* cited by examiner

*Primary Examiner*—Chuong D. Ngo
(74) *Attorney, Agent, or Firm*—Dougherty Clements; Christopher L. Bernard; Tyler S. Brown

(57) ABSTRACT

A method and apparatus for performing Galois field multiplication with reduced redundancy. Generally, multiplication by a Galois field multiplier involves the multiplication of two polynomials modulo another polynomial. The Galois field multiplier has two Galois Field elements in a field of $GF(2^n)$ that correspond to the binary polynomials A[X] and B[X]:

$$A[X]=a_{n-1}X^{n-1}+a_{n-2}X^{n-2}+a_{n-3}X^{n-3}+ \ldots a_1X+a_0,$$

$$B[X]=b_{n-1}X^{n-1}+b_{n-2}X^{n-2}+b_{n-3}X^{n-3}+ \ldots b_1X+b_0,$$

where n corresponds to a number of terms in a Galois extension field of the Galois multiplier, and n-1 is an order of the polynomial A[X]. Premultiplier logic translates the binary polynomial A[X] into a binary vector $c_r$, where r is the number of terms of the vector. The premultiplier logic is configured to modulo-2 add together various coefficients of the $a_0$ through $a_{n-1}$ coefficients to produce various terms $c_0$ through $c_{r-1}$ of the $c_r$ binary vector. Binary multiplication and addition logic then operates on the $c_0$ through $c_{r-1}$ coefficients and the $b_0$ through $b_{n-1}$ coefficients to produce $d_0$ through $d_n$ coefficients of a binary polynomial D[X]. The coefficients $d_0$ through $d_n$ are the output of the Galois field multiplier. Utilization of the premultiplier logic component reduces the amount of binary multiplication and addition logic needed to produce the coefficients $d_0$ through $d_n$ of the binary polynomial D[X].

19 Claims, 15 Drawing Sheets

BIT 1 COMPUTATION LOGIC

BIT 2 COMPUTATION LOGIC

BIT 3 COMPUTATION LOGIC

BIT 4 COMPUTATION LOGIC

BIT 6 COMPUTATION LOGIC

BIT 7 COMPUTATION LOGIC

BIT 9 COMPUTATION LOGIC

BIT 10 COMPUTATION LOGIC

METHOD AND APPARATUS FOR EFFICIENTLY PERFORMING GALOIS FIELD MULTIPLICATION

CROSS-REFERENCE TO RELATED APPLICATIONS

This application claims priority to a provisional application that was filed on Feb. 21, 2002, entitled OC-192 Forward Error Correction and Sonet Transport Overhead ASIC Functional Specification, having Ser. No. 60/359,274, which is incorporated by reference herein in its entirety.

TECHNICAL FIELD OF THE INVENTION

The present invention relates to communications and, more particularly, to a method and apparatus for performing Galois field multiplication with an efficient implementation that utilizes a relatively small number of logic gates to perform Galois field multiplication at very high speeds.

BACKGROUND OF THE INVENTION

When information is transmitted over a communications link between a receiver and a transmitter, the bits that describe the information being transmitted can be corrupted. In other words, the receiver may determine that a received bit that is supposed to be a binary 1 is a binary 0, and vice versa. Corruption of bits in a data stream may be caused by a variety of factors or components in the communications link. For example, in an optical fiber network, optical energy is transmitted in the form of optical pulses that have particular levels that correspond to binary 1s and 0s. If the level of the optical energy is too low, the receiver can have difficulty determining whether a pulse corresponds to a binary 1 or a binary 0. Repeaters, or amplifiers, normally are disposed at particular locations along the communications link that amplify the optical signals so that they are at the proper levels to enable the receiver to determine whether it has received a binary 1 or a binary 0. Typically, the optical signals are converted into electrical signals at the repeaters. The electrical signals are then amplified and converted into optical signals, which are then modulated back onto the optical fiber. Similarly, at the receiver, the optical signals typically are converted back into electrical signals, which the receiver compares to a threshold value to determine whether it has received a binary 1 or a binary 0.

Because it is possible for the bits to be corrupted, techniques have been developed and implemented that provide error correction. In other words, if a bit received by the receiver is erroneously determined to be a binary 1 when it was meant to be a binary 0 when it was transmitted, and vice versa, receivers utilize various techniques to determine whether a bit value has been incorrectly identified and to correct the bit value. One known technique used for such purposes is generally referred to as the "Automatic Request To Transmit" (ARM) technique. In accordance with this technique, when the receiver detects a bit error, it sends a signal to the transmitter that tells the transmitter to retransmit the block of data that contained the error. The receiver processes the retransmitted data block and detects bit errors. The data block may need to be retransmitted several times before the receiver determines that the data is without error. Of course, retransmitting data utilizes bandwidth and generally slows down the overall throughput of the communications system.

A technique known as Forward Error Correction (FEC) is commonly used in the communications industry to reduce errors in data being transmitted over a communications link without requiring retransmission of data. FEC not only detects bit errors, but corrects detected bit errors. One of the primary advantages of FEC over ARM is that no retransmission of data is required with FEC. This is because FEC techniques introduce redundancy in the data bits that enables the receiver of a communications system to detect errors in data being transmitted and to correct the detected errors. The redundancy generally is introduced by utilizing data bits from the data stream to encode the data stream. The receiver has a decoder that has intelligence with regard to the encoding scheme used by the transmitter, which enables the receiver to decode the data and detect and correct errors without the need for retransmission. Another advantage of FEC is that, because it does not require retransmission of data, simplex links can be used, which is desirable in certain situations, such as when the receivers are receive-only terminals.

Generally, FEC techniques and systems fall into two broad categories, namely, block coding and convolution coding. Various block coding and convolution coding techniques are currently in use in the communications industry. In the past, the use of block codes has generally been limited to use in communications systems that have relatively low data rates for various reasons, such as the aforementioned adverse effects on overall coding gain (signal-to-noise ratio, $E_b/N_o$), which is expressed in decibels (dB), for short data bursts and the reduced overall throughput that can result from the synchronization requirement. Convolution coding has generally been the preferred FEC technique for high data rate implementations. However, convolution coding results in higher output bit error rates (BER) than the output (BERs) that can be achieved using block coding. Some customers want FEC systems with very low BERs (e.g., $10^{-15}$), which generally cannot be achieved using convolution coding, but which can be achieved using block coding, such as Bose-Chaudhuri-Hocquenghem (BCH) block coding, for example.

Error correction coding with algebraic codes such as BCH and Reed-Solomon (RS) codes, for example, requires arithmetic operations in finite fields or Galois Fields. BCH and RS codes of length 8191 or shortened versions of the code have arithmetic operations in Galois Field (GF) of, for example ($2^{13}$), which is a binary extension field with 8192 ($2^{13}$) elements. This corresponds to a polynomial of the order 13, which has $2^{13}$ binary coefficients. Of course, polynomials of orders other than 13 may also be used. Because the multiplier is used extensively in the decoding of such codes, an efficient implementation of the multiplier would result in a much smaller implementation of the decoder. To date, Galois multipliers utilize an enormous number of logic gates to perform the logic operations that are necessary to operate on such large numbers of bits.

It would be desirable to provide a Galois multiplier that is capable of being implemented with a relatively small number of gates for a given binary extension field. Reducing the number of gates utilized would increase the decoding speed, the amount of real estate on the integrated circuit (IC) utilized by the decoder, and the amount of power consumed by the decoder.

Accordingly, a need exists for a method and apparatus for performing Galois multiplication operations with increased efficiency in terms of the number of gates needed to perform the operations, the amount of area on the IC required for implementation of the decoder, and the power consumption requirements associated with the Galois multiplier logic of the decoder.

SUMMARY OF THE INVENTION

The present invention provides a method and apparatus for performing Galois field multiplication. Generally, multiplication by a Galois field multiplier involves the multiplication of two polynomials modulo another polynomial. The Galois field multiplier has two Galois Field elements in a field of $GF(2^n)$ that correspond to the binary polynomials $A[X]$ and $B[X]$:

$$A[X]=a_{n-1}X^{n-1}+a_{n-2}X^{n-2}+a_{n-3}X^{n-3}+\ldots a_1X+a_0,$$

$$B[X]=b_{n-1}X^{n-1}+b_{n-2}X^{n-2}+b_{n-3}X^{n-3}+\ldots b_1X+b_0,$$

where n corresponds to the number of terms in the Galois extension field of the Galois multiplier and n−1 is the order of the polynomial $A[X]$. Premultiplier logic translates the binary polynomial $A[X]$ into a binary vector $c_r$, where r is the number of terms in the vector. The premultiplier logic is configured to modulo-2 add together various coefficients of the $a_0$ through $a_{n-1}$ coefficients to produce terms $c_0$ through $c_{r-1}$. Binary multiplication-addition logic then operates on the $c_0$ through $c_{r-1}$ terms and the $b_0$ through $b_{n-1}$ coefficients to produce $d_0$ through $d_n$ coefficients of a binary polynomial $D[X]$. The coefficients $d_0$ through $d_n$ are the output of the Galois field multiplier. Utilization of the premultiplier logic component reduces the amount of binary multiplication-addition logic needed to produce the coefficients $d_0$ through $d_{n-1}$ of the binary polynomial $D[X]$.

By reducing the amount of logic needed to produce the $d_n$ terms, the amount of area required for implementation of the Galois field multiplier and the amount of power consumed by the multiplier are reduced.

These and other features and advantages of the present invention will become apparent from the following description, drawings and claims.

DETAILED DESCRIPTION OF THE PREFERRED EMBODIMENT OF THE INVENTION

Figure 1:
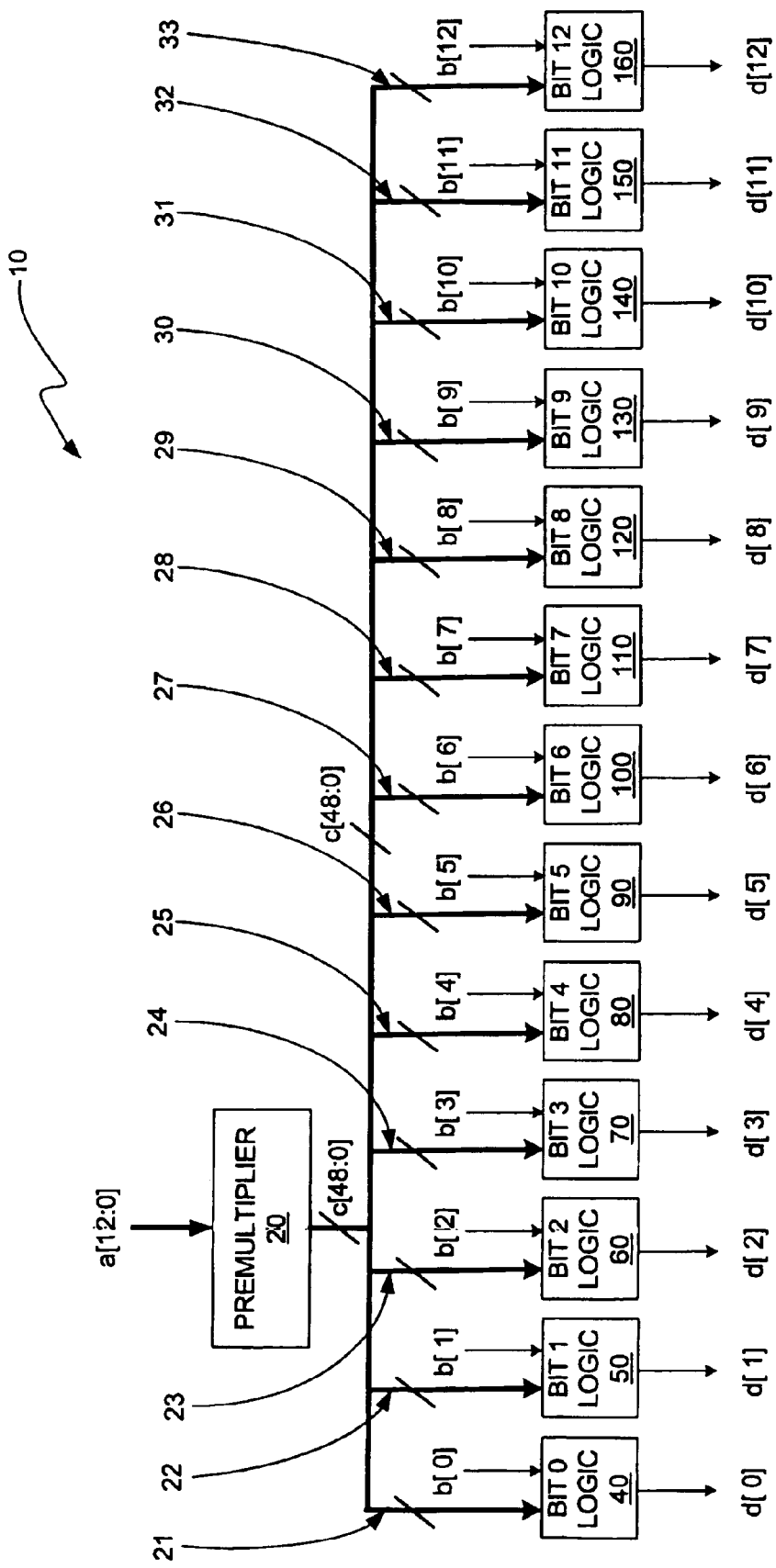
FIG. 1 is a block diagram of the Galois multiplier of the present invention in accordance with an example embodiment wherein the multiplier is based on a $13^{th}$ order polynomial.

The present invention provides a method and apparatus for efficiently implementing a Galois multiplier. For example purposes, the Galois multiplier of the present invention will be described with reference to a binary extension field of $2^{13}$ terms (i.e., logic 1s and 0s corresponding to the coefficients of a $13^{th}$ order polynomial). However, the present invention applies equally to Galois multipliers having larger and smaller binary extension fields. In other words, the reduction in the number of logic gates needed to implement the Galois multiplier of the present invention will be reduced regardless of the size of the Galois field. The present invention is being described only with reference to a Galois multiplier having a binary extension field of $2^{13}$ for purposes of brevity and for ease of illustration. Those skilled in the art will understand, in view of the description provided herein, the manner in which the concepts and principles of the present invention can be applied to reduce the number of logic gates needed to implement a Galois multiplier having a binary extension field of any size. In essence, it will be first shown mathematically how, in accordance with the present invention, the number of terms associated with a Galois binary extension field can be reduced, and then it will be shown physically how the number of logic gates needed to operate on the reduced number of terms can be reduced accordingly.

$GF(2^{13})$ is a common notation for a Galois Field or Finite Field with $2^{13}$ elements, which corresponds to 8192 elements. This notation indicates a binary extension field where each of the 8192 elements in the field is represented by an n-order binary polynomial. The polynomial $X^{12}+X^7+X^6+X^2+1$ is an example of a binary polynimial in $GF(2^{13})$ that could constitute one of the 8192 elements. This polynomial can also be represented by the binary number 1000011000101. It should be noted that there is a logic 1 in the position of each non-zero element in the polynomial and logic 0s are in the positions where there are no elements. This can easily be seen when the polynomial $X^{12}+X^7+X^6+X^2+1$ is expressed as: $1X^{12}+0X^{11}+0X^{10}+0X^9+0X^8+1X^7+1X^6+0X^5+0X^4+0X^3+X^2+1$.

When two polynomials are added, each element in the polynomial is added with modulo-2 (i.e., exclusive OR (XOR)) arithmetic to the element of the other polynomial with the same power of X. The following example demonstrates the modulo-2 addition of two polynomials:

$$1X^{12} + 1X^{11} + 1X^{10} + 0X^9 + 1X^8 +$$
$$0X^7 + 1X^6 + 0X^5 + 1X^4 + 1X^3 + 1X^2 + 1X + 1$$
$$+ 1X^{12} + 0X^{11} + 1X^{10} + 1X^9 + 1X^8 + 0X^7 +$$
$$0X^6 + 1X^5 + 1X^4 + 0X^3 + 1X^2 + 0X + 1$$
$$= 0101001101010$$

Using the alternative notation with only the coefficients of the polynomials shown, the modulo-2 addition produces the following results:

```
    1110101011111
  + 1011100110101
  = 0101001101010
```

The multiplication performed by a Galois multiplier is quite a bit more complicated. Generally, multiplication by a Galois multiplier involves the multiplication of the two polynomials modulo another polynomial. The two Galois Field elements in $GF(2^{13})$, designated as A and B herein, are defined by the following binary polynomials:

$$A[X] = a_{12}X^{12} + a_{11}X^{11} + a_{10}X^{10} + a_9X^9 + a_8X^8 + a_7X^7 + a_6X^6 + a_5X^5 + a_4X^4 + a_3X^3 + a_2X^2 + a_1X^1 + a_0$$

$$B[X] = b_{12}X^{12} + b_{11}X^{11} + b_{10}X^{10} + b_9X^9 + b_8X^8 + b_7X^7 + b_6X^6 + b_5X^5 + b_4X^4 + b_3X^3 + b_2X^2 + b_1X^1 + b_0$$

Multiplication of the elements A and B in $GF(2^{13})$ is defined by the following equation:

$$D[X] = A[X] * B[X] \; \text{modulo}(X^{13} + X^4 + X^3 + X + 1)$$

Multiplication of Elements A and B Resulting in the Following Polynomial D[X]

The result of the multiplication of A and B in the $GF(2^{13})$ field is the polynomial D[X] having the following terms:

$$D[X] = d_{12}X^{12} + d_{11}X^{11} + d_{10}X^{10} + d_9X^9 + d_8X^8 + d_7X^7 + d_6X^6 + d_5X^5 + d_4X^4 + d_3X^3 + d_2X^2 + d_1X^1 + d_0,$$

where the coefficients of D[X] are defined as follows:

$d_0 = a_0b_0 + a_1b_{12} + a_2b_{11} + a_3b_{10} + a_4b_9 + a_5b_8 + a_6b_7 + a_7b_6 + a_8b_5 + a_9b_4 + a_{10}b_3 + a_{10}b_{12} + a_{11}b_2 + a_{11}b_{11} + a_{11}b_{12} + a_{12}b_{10} + a_{12}b_{10} + a_{12}b_{11};$ $d_1 = a_0b_1 + a_1b_0 + a_1b_{12} + a_2b_{11} + a_2b_{12} + a_3b_{10} + a_3b_{11} + a_4b_9 + a_4b_{10} + a_5b_8 + a_5b_9 + a_6b_7 + a_6b_8 + a_7b_6 + a_7b_7 + a_8b_5 + a_8b_6 + a_9b_4 + a_9b_5 + a_{10}b_3 + a_{10}b_4 + a_{10}b_{12} + a_{11}b_2 + a_{11}b_3 + a_{11}b_{11} + a_{12}b_2 + a_{12}b_{10} + a_{12}b_{12};$ $d_2 = a_0b_2 + a_1b_1 + a_2b_0 + a_2b_{12} + a_3b_{11} + a_3b_{12} + a_4b_{10} + a_4b_{11} + a_5b_9 + a_5b_{10} + a_6b_8 + a_6b_9 + a_7b_7 + a_7b_8 + a_8b_6 + a_8b_7 + a_9b_5 + a_9b_6 + a_{10}b_4 + a_{10}b_5 + a_{11}b_3 + a_{11}b_4 + a_{11}b_{12} + a_{12}b_2 + a_{12}b_3 + a_{12}b_{11};$ $d_3 = a_0b_3 + a_1b_2 + a_1b_{12} + a_2b_1 + a_2b_{11} + a_3b_0 + a_3b_{10} + a_3b_{12} + a_4b_9 + a_4b_{11} + a_4b_{12} + a_5b_8 + a_5b_{10} + a_5b_{11} + a_6b_7 + a_6b_9 + a_6b_{10} + a_7b_6 + a_7b_8 + a_7b_9 + a_8b_5 + a_8b_7 + a_8b_8 + a_9b_4 + a_9b_6 + a_9b_7 + a_{10}b_3 + a_{10}b_5 + a_{10}b_6 + a_{10}b_{12} + a_{11}b_2 + a_{11}b_4 + a_{11}b_5 + a_{11}b_{11} + a_{11}b_{12} + a_{12}b_1 + a_{12}b_3 + a_{12}b_4 + a_{12}b_{10} + a_{12}b_{11} + a_{12}b_{12};$ $d_4 = a_0b_4 + a_1b_3 + a_1b_{12} + a_2b_2 + a_2b_{11} + a_2b_{12} + a_3b_1 + a_3b_{10} + a_3b_{11} + a_4b_0 + a_4b_9 + a_4b_{10} + a_4b_{12} + a_5b_8 + a_5b_9 + a_5b_{11} + a_5b_{12} + a_6b_7 + a_6b_8 + a_6b_{10} + a_6b_{11} + a_7b_6 + a_7b_7 + a_7b_9 + a_7b_{10} + a_8b_5 + a_8b_6 + a_8b_8 + a_8b_9 + a_9b_4 + a_9b_5 + a_9b_7 + a_9b_8 + a_{10}b_3 + a_{10}b_4 + a_{10}b_6 + a_{10}b_7 + a_{10}b_{12} + a_{11}b_2 + a_{11}b_3 + a_{11}b_5 + a_{11}b_6 + a_{11}b_{11} + a_{12}b_1 + a_{12}b_2 + a_{12}b_4 + a_{12}b_5 + a_{12}b_{10} + a_{12}b_{12};$ $d_5 = a_0b_5 + a_1b_4 + a_2b_3 + a_2b_{12} + a_3b_2 + a_3b_{11} + a_3b_{12} + a_4b_1 + a_4b_{10} + a_4b_{11} + a_5b_0 + a_5b_9 + a_5b_{10} + a_5b_{12} + a_6b_8 + a_6b_9 + a_6b_{11} + a_6b_{12} + a_7b_7 + a_7b_8 + a_7b_{10} + a_7b_{11} + a_8b_6 + a_8b_7 + a_8b_9 + a_8b_{10} + a_9b_5 + a_9b_6 + a_9b_8 + a_9b_9 + a_{10}b_4 + a_{10}b_5 + a_{10}b_7 + a_{10}b_8 + a_{11}b_3 + a_{11}b_4 + a_{11}b_6 + a_{11}b_7 + a_{11}b_{12} + a_{12}b_2 + a_{12}b_3 + a_{12}b_5 + a_{12}b_6 + a_{12}b_{11};$ $d_6 = a_0b_6 + a_1b_5 + a_2b_4 + a_3b_3 + a_3b_{12} + a_4b_2 + a_4b_{11} + a_4b_{12} + a_5b_1 + a_5b_{10} + a_5b_{11} + a_6b_0 + a_6b_9 + a_6b_{10} + a_6b_{12} + a_7b_8 + a_7b_9 + a_7b_{11} + a_7b_{12} + a_8b_7 + a_8b_8 + a_8b_{10} + a_8b_{11} + a_9b_6 + a_9b_7 + a_9b_9 + a_9b_{10} + a_{10}b_5 + a_{10}b_6 + a_{10}b_8 + a_{10}b_9 + a_{11}b_4 + a_{11}b_5 + a_{11}b_7 + a_{11}b_8 + a_{12}b_3 + a_{12}b_4 + a_{12}b_6 + a_{12}b_7 + a_{12}b_{12};$ $d_7 = a_0b_7 + a_1b_6 + a_2b_5 + a_3b_4 + a_4b_3 + a_4b_{12} + a_5b_2 + a_5b_{11} + a_5b_{12} + a_6b_1 + a_6b_{10} + a_6b_{11} + a_7b_0 + a_7b_9 + a_7b_{10} + a_7b_{12} + a_8b_8 + a_8b_9 + a_8b_{11} + a_8b_{12} + a_9b_7 + a_9b_8 + a_9b_{10} + a_9b_{11} + a_{10}b_6 + a_{10}b_7 + a_{10}b_9 + a_{10}b_{10} + a_{11}b_5 + a_{11}b_6 + a_{11}b_8 + a_{11}b_9 + a_{12}b_4 + a_{12}b_5 + a_{12}b_7 + a_{12}b_8;$ $d_8 = a_0b_8 + a_1b_7 + a_2b_6 + a_3b_5 + a_4b_4 + a_5b_3 + a_5b_{12} + a_6b_2 + a_6b_{11} + a_6b_{12} + a_7b_1 + a_7b_{10} + a_7b_{11} + a_8b_0 + a_8b_9 + a_8b_{10} + a_8b_{12} + a_9b_8 + a_9b_9 + a_9b_{11} + a_9b_{12} + a_{10}b_7 + a_{10}b_8 + a_{10}b_{10} + a_{10}b_{11} + a_{11}b_6 + a_{11}b_7 + a_{11}b_9 + a_{11}b_{10} + a_{12}b_5 + a_{12}b_6 + a_{12}b_8 + a_{12}b_9;$ $d_9 = a_0b_9 + a_1b_8 + a_2b_7 + a_3b_6 + a_4b_5 + a_5b_4 + a_6b_3 + a_6b_{12} + a_7b_2 + a_7b_{11} + a_7b_{12} + a_8b_1 + a_8b_{10} + a_8b_{11} + a_9b_0 + a_9b_9 + a_9b_{10} + a_9b_{12} + a_{10}b_8 + a_{10}b_9 + a_{10}b_{11} + a_{10}b_{12} + a_{11}b_7 + a_{11}b_8 + a_{11}b_{10} + a_{11}b_{11} + a_{12}b_6 + a_{12}b_7 + a_{12}b_9 + a_{12}b_{10};$ $d_{10} = a_0b_{10} + a_1b_9 + a_2b_8 + a_3b_7 + a_4b_6 + a_5b_5 + a_6b_4 + a_7b_3 + a_7b_{12} + a_8b_2 + a_8b_{11} + a_8b_{12} + a_9b_1 + a_9b_{10} + a_9b_{11} + a_{10}b_0 + a_{10}b_9 + a_{10}b_{10} + a_{10}b_{12} + a_{11}b_8 + a_{11}b_9 + a_{11}b_{11} + a_{11}b_{12} + a_{12}b_7 + a_{12}b_8 + a_{12}b_{10} + a_{12}b_{11};$ $d_{11} = a_0b_{11} + a_1b_{10} + a_2b_9 + a_3b_8 + a_4b_7 + a_5b_6 + a_6b_5 + a_7b_4 + a_8b_3 + a_8b_{12} + a_9b_2 + a_9b_{11} + a_9b_{12} + a_{10}b_1 + a_{10}b_{10} + a_{10}b_{11} + a_{11}b_0 + a_{11}b_9 + a_{11}b_{10} + a_{11}b_{12} + a_{12}b_8 + a_{12}b_9 + a_{12}b_{11} + a_{12}b_{12};$ $d_{12} = a_0b_{12} + a_1b_{11} + a_2b_{10} + a_3b_9 + a_4b_8 + a_5b_7 + a_6b_6 + a_7b_5 + a_8b_4 + a_9b_3 + a_9b_{12} + a_{10}b_2 + a_{10}b_{11} + a_{10}b_{12} + a_{11}b_1 + a_{11}b_{10} + a_{11}b_{11} + a_{12}b_0 + a_{12}b_9 + a_{12}b_{10} + a_{12}b_{12};$

It is apparent that a very large number of logic gates would be needed to perform the mathematic operations indicated above to obtain the $d_n$ terms, $d_0$ through $d_{12}$. In accordance with the present invention, it has been determined that the terms $d_0$ through $d_{12}$ shown above can be reduced as follows by using $c_r$ terms, $c_0$ through $c_{48}$, which are derived from the $a_n$ terms, $a_0$ through $a_{12}$:

$d_0 = b_0c_0 + b_1c_{12} + b_2c_{11} + b_3c_{10} + b_4c_9 + b_5c_8 + b_6c_7 + b_7c_6 + b_8c_5 + b_9c_4 + b_{10}c_{16} + b_{11}C_{28} + b_{12}c_{26};$ $d_1 = b_0c_1 + b_1c_{13} + b_2c_{24} + b_3c_{23} + b_4c_{22} + b_5c_{21} + b_6c_{20} + b_7c_{19} + b_8c_{18} + b_9c_{17} + b_{10}c_{29} + b_{11}c_{27} + b_{12}c_{37};$ $d_2 = b_0c_2 + b_1c_1 + b_2C_{13} + b_3c_{24} + b_4c_{23} + b_5c_{22} + b_6c_{21} + b_7c_{20} + b_8c_{19} + b_9c_{18} + b_{10}c_{17} + b_{11}c_{29} + b_{12}c_{27};$ $d_3 = b_0c_3 + b_1c_{15} + b_2c_{14} + b_3c_{25} + b_4c_{35} + b_5c_{34} + b_6C_{13} + b_7c_{32} + b_8c_{31} + b_9C_{30} + b_{10}c_{38} + b_{11}c_{45} + b_{12}c_{48};$ $d_4 = b_0c_4 + b_1c_{16} + b_2c_{28} + b_3c_{26} + b_4c_{36} + b_5c_{43} + b_6c_{42} + b_7c_{41} + b_8c_{40} + b_9c_{39} + b_{10}c_{46} + b_{11}c_{44} + b_{12}c_{47};$ $d_5 = b_0c_5 + b_1c_4 + b_2c_{16} + b_3c_{28} + b_4c_{26} + b_5c_{36} + b_6c_{43} + b_7c_{42} + b_8c_{41} + b_9c_{40} + b_{10}c_{39} + b_{11}c_{46} + b_{12}c_{44};$ $d_6=b_0c_6+b_1c_5+b_2c_4+b_3c_{16}+b_4c_{28}+b_5c_{26}+b_6c_{36}+b_7c_{43}+b_8c_{42}+b_9c_{41}+b_{10}c_{40}+b_{11}c_{39}+b_{12}c_{46};$ $d_7=b_0c_7+b_1c_6+b_2c_5+b_3c_4+b_4c_{16}+b_5c_{28}+b_6c_{26}+b_7c_{36}+b_8c_{43}+b_9c_{42}+b_{10}c_{41}+b_{11}c_{40}+b_{12}c_{39};$ $d_8=b_0c_8+b_1c_7+b_2c_6+b_3c_5+b_4c_4+b_5c_{16}+b_6c_{28}+b_7c_{26}+b_8c_{36}+b_9c_{43}+b_{10}c_{42}+b_{11}c_{41}+b_{12}c_{40};$ $d_9=b_0c_9+b_1c_8+b_2c_7+b_3c_6+b_4c_5+b_5c_4+b_6c_{16}+b_7c_{28}+b_8c_{26}+b_9c_{36}+b_{10}c_{43}+b_{11}c_{42}+b_{12}c_{41};$ $d_{10}=b_0c_{10}+b_1c_9+b_2c_8+b_3c_7+b_4c_6+b_5c_5+b_6c_4+b_7c_{16}+b_8c_{28}+b_9c_{26}+b_{10}c_{36}+b_{11}c_{43}+b_{12}c_{42};$ $d_{11}=b_0c_{11}+b_1c_{10}+b_2c_9+b_3c_8+b_4c_7+b_5c_6+b_6c_5+b_7c_4+b_8c_{16}+b_9c_{28}+b_{10}c_{26}+b_{11}c_{36}+b_{12}c_{43};$ $d_{12}=b_0c_{12}+b_1c_{11}+b_2c_{10}+b_3c_9+b_4c_8+b_5c_7+b_6c_6+b_7c_5+b_8c_4+b_9c_{16}+b_{10}c_{28}+b_{11}c_{26}+b_{12}c_{36};$

The set of terms $c_r$ is defined as follows:

$c_0=a_0;$ $c_1=a_1;$ $c_2=a_2;$ $c_3=a_3;$ $c_4=a_4;$ $c_5=a_5;$ $c_6=a_6;$ $c_7=a_7;$ $c_8=a_8;$ $c_9=a_9;$ $c_{10}=a_{10};$ $c_{11}=a_{11};$ $c_{12}=a_{12};$ $c_{13}=a_0+a_{12};$ $C_{14}=a_1+a_{11};$ $c_{15}=a_2+a_{12};$ $c_{16}=a_3+a_{12};$ $c_{17}=a_4+a_5;$ $c_{18}=a_5+a_6;$ $c_{19}=a_6+a_7;$ $c_{20}=a_7+a_8;$ $c_{21}=a_8+a_9;$ $c_{22}=a_9+a_{10};$ $c_{23}=a_{10}+a_{11};$ $c_{24}=a_{11}+a_{12};$ $c_{25}=a_0+a_{10}+a_{12};$ $c_{26}=a_1+a_{10}+a_{11};$ $c_{27}=a_2+a_3+a_{11};$ $c_{28}=a_2+a_{11}+a_{12};$ $c_{29}=a_3+a_4+a_{12};$ $c_{30}=a_4+a_6+a_7;$ $c_{31}=a_5+a_7+a_8;$ $c_{32}=a_6+a_8+a_9;$ $c_{33}\ a_7+a_9+a_{10};$ $c_{34}=a_8+a_{10}+a_{11};$ $c_{35}=a_9+a_{11}+a_{12};$ $c_{36}=a_0+a_9+a_{10}+a_{12};$ $c_{37}=a_1+a_2+a_{10}+a_{12};$ $c_{38}=a_3+a_5+a_6+a_{12};$ $c_{39}=a_4+a_5+a_7+a_8;$ $c_{40}=a_5+a_6+a_8+a_9;$ $c_{41}=a_6+a_7+a_9+a_{10};$ $c_{42}=a_7+a_8+a_{10}+a_{11};$ $c_{43}=a_8+a_9+a_{11}+a_{12};$ $c_{44}=a_2+a_3+a_5+a_6+a_{11};$ $c_{45}=a_2+a_4+a_5+a_{11}+a_{12};$ $c_{46}=a_3+a_4+a_6+a_7+a_{12};$ $c_{47}=a_1+a_2+a_4+a_5+a_{10}+a_{12};$ $c_{48}=a_1+a_3+a_4+a_{10}+a_{11}+a_{12};$

As a result of the above simplification of the present invention, the Galois multiplier of the present invention has been implemented with at least about a 40% reduction in the number of gates typically used to implement a Galois multiplier. FIG. 1 is a block diagram of the Galois multiplier 10 of the present invention in accordance with an example embodiment wherein the multiplier 10 is based on a $13^{th}$-order polynomial. As stated above, the principles and concepts of the present invention can be applied to any Galois filed size, as will be understood by those skilled in the art in view of the description provided herein.

Figure 2:
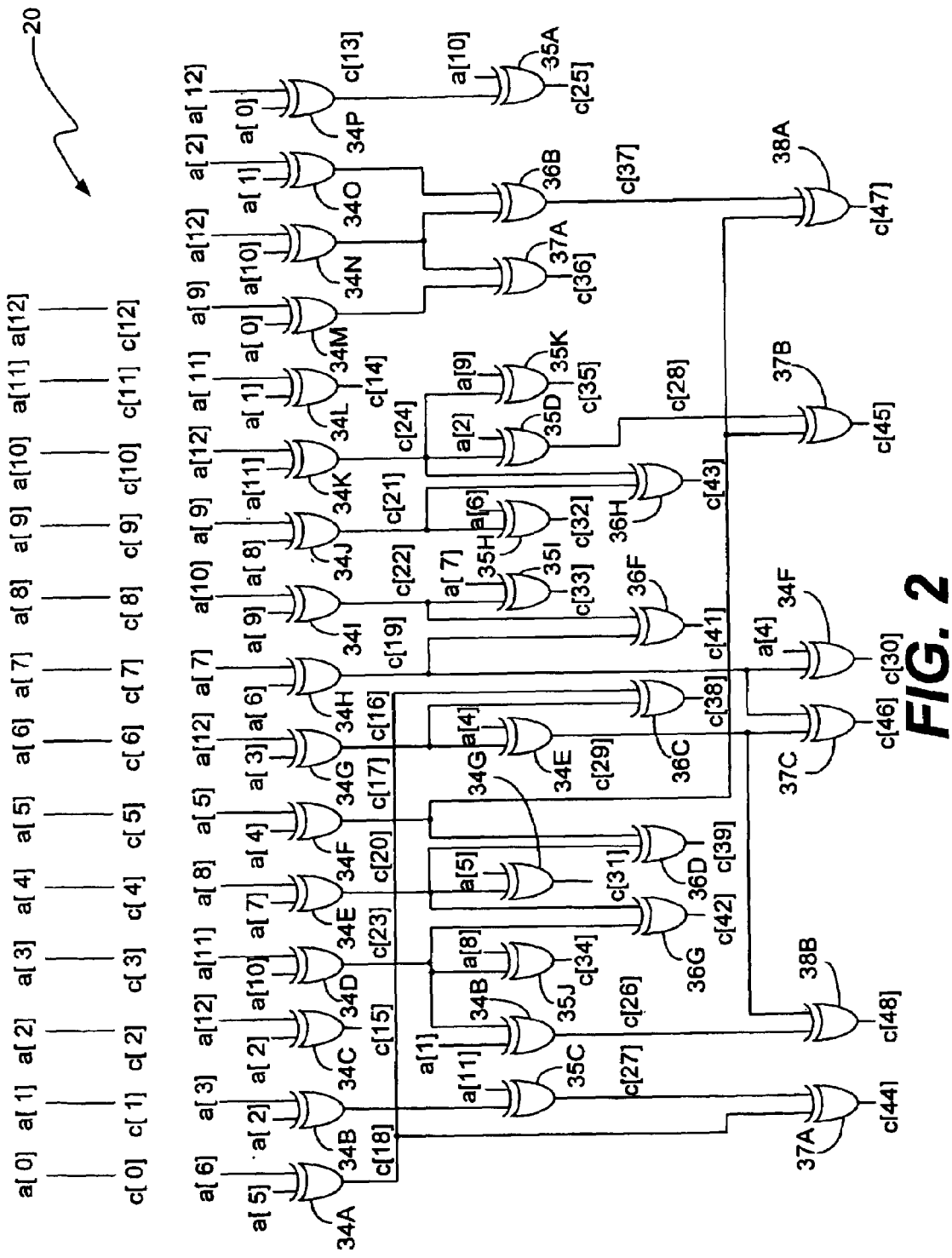
FIG. 2 is a schematic diagram of the premultiplier logic component of the present invention shown in FIG. 1.

The Galois multiplier 10, which preferably is implemented in hardware in an application specific integrated circuit (ASIC), which comprises a premultiplier 20 that generates the terms $c_0$ through $c_{48}$ from the terms $a_0$ through $a_{12}$, as described below in detail with reference to FIG. 2. The premultiplier 20 produces the $c_r$ terms, $c_0$ through $c_{48}$. As can be seen from the listing of the $c_r$ term above, terms $c_0$ through $c_{12}$ correspond to terms $a_0$ through $a_{12}$, respectively. Therefore, no operations are performed to produce terms $c_0$ through $c_{12}$. The remainder of the $c_r$ terms, $c_{13}$ through $c_{48}$, are produced by summing (i.e., XORing) various an terms, as described below in detail with reference to FIG. 2. The $c_r$ terms are then operated on by multiplication logic (e.g., AND gates) and addition logic (e.g., XOR gates) by bit logic configurations 40, 50, 60, 70, 80, 90, 100, 110, 120, 130, 140, 150 and 160 to produce terms d[0], d[1], d[2], d[3], d[4], d[5], d[6], d[7], d[8], d[9], d[10], d[11] and d[12], respectively, thereby completing the Galois multiplication.

FIGS. 3, 4, 5, 6, 7, 8, 9, 10, 11, 12, 13, 14 and 15 are schematic diagrams illustrating bit logic 40, 50, 60, 70, 80, 90, 100, 110, 120, 130, 140, 150 and 160, respectively, and those diagrams will be discussed below in detail.

The arrows 21 through 33 in FIG. 1 point to thirteen, 13-bit lines that each provide thirteen various $c_r$ terms to each of the thirteen logic circuits 40 through 160, as described below in detail with reference to FIGS. 3 through 15, respectively. Before describing the bit logic circuits 40 through 160, the premultiplier logic 20 that produces the $c_r$ terms will first be described with reference to FIG. 2. As shown in FIG. 2, bits a[0]–a[12] correspond directly to bits c[0]–c[12], respectively. However, bits c[13]–c[48] are produced by modulo-2 adding various $a_n$ terms together, which are performed with XOR logic gates 34A–34P, 35A–35K, 36A–36H, 37A–37C and 35A and B. The XOR gates that sum only 2 bits correspond to XOR gates 21A–21P. The XOR gates that sum 3 bits correspond to XOR gates 35A–35K. The XOR gates that sum 4 bits correspond to XOR gates 36A–36H. The XOR gates that sum 5 bits correspond to XOR gates 37A–37C. The XOR gates that sum 6 bits correspond to XOR gates 38A and 38B. The diagram illustrated in FIG. 2 clearly indicates which bits are summed to obtain the 49 $c_r$ terms.

Figure 3:
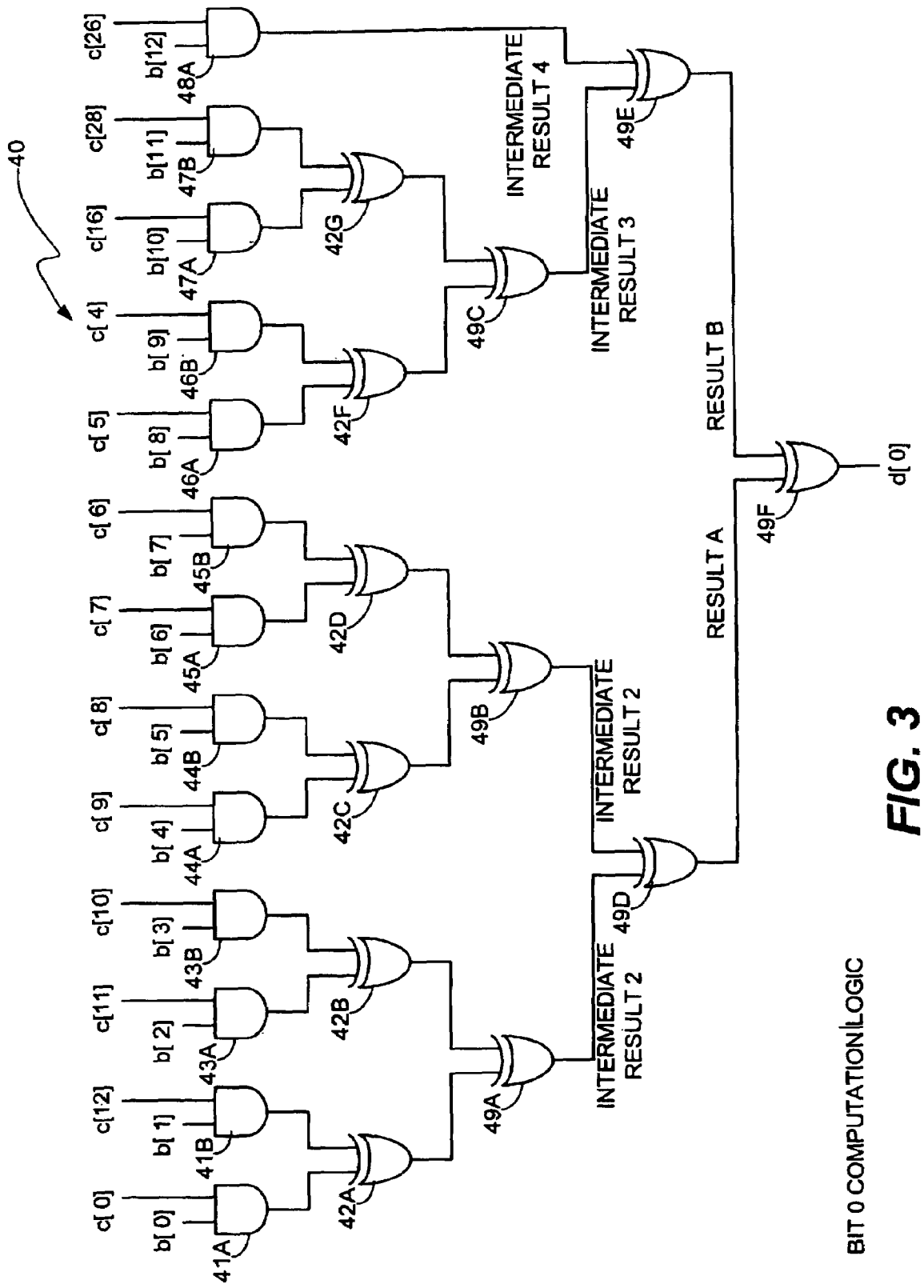
FIG. 3 is a schematic diagram of the binary multiplication and addition logic shown in block diagram form in FIG. 1 for determining bit d[0].

Once the 49 $c_r$ terms have been produced by the premultiplier 20, various 13-bit groups of $c_r$ terms are processed by each of the 13 multiplication/addition logic circuits shown in FIGS. 3–15. The manner in which each of these circuits operates to produce the d[0]–d[12] terms will now be described. FIG. 3 schematically illustrates the multiplication/addition logic 40 for generating the d[0] term. With reference to FIG. 3, AND gates 41A and 41B multiply bits b[0] and c[0] together and bits b[1] and c[12] together, respectively. The results of these two ANDing operations are then modulo-2 added together by XOR gate 42A. AND gates 43A and 43B multiply bits b[2] and c[11] together and bits b[3] and c[10] together, respectively. The results of these two ANDing operations are then modulo-2 added together by XOR gate 42B. The outputs of XOR gates 42A and 42B are then modulo-2 added together by XOR gate 49A to produce intermediate result 1.

Likewise, AND gates 44A and 44B multiply bits b[4] and c[9] together and bits b[5] and c[8] together, respectively. The results of these two ANDing operations are then modulo-2 added together by XOR gate 42C. AND gates 45A and 45B multiply bits b[6] and c[7] together and bits b[7] and c[6] together, respectively. The results of these two ANDing operations are then modulo-2 added together by XOR gate 42D. The outputs of XOR gates 42C and 42D are then modulo-2 added together by XOR gate 49B to produce intermediate result 2. Intermediate results 1 and 2 are then modulo-2 added together by XOR gate 49D to produce result A.

Likewise, AND gates 46A and 46B multiply bits b[8] and c[5] together and bits b[9] and c[4] together, respectively. The results of these two ANDing operations are then modulo-2 added together by XOR gate 42F. AND gates 47A and 47B multiply bits b[11] and c[28] together and bits b[12] and c[26] together, respectively. The results of these two ANDing operations are then modulo-2 added together by XOR gate 42G. The outputs of XOR gates 42F and 42G are then modulo-2 added together by XOR gate 49C to produce intermediate result 3. Bits b[12] and c[26] are multiplied together by AND gate 48A, and the results of that operation are modulo-2 added to intermediate result 3 by XOR gate 49E to produce result B. Results A and B are then modulo-2 added together by XOR gate 49F to produce term d[0].

Figure 4:
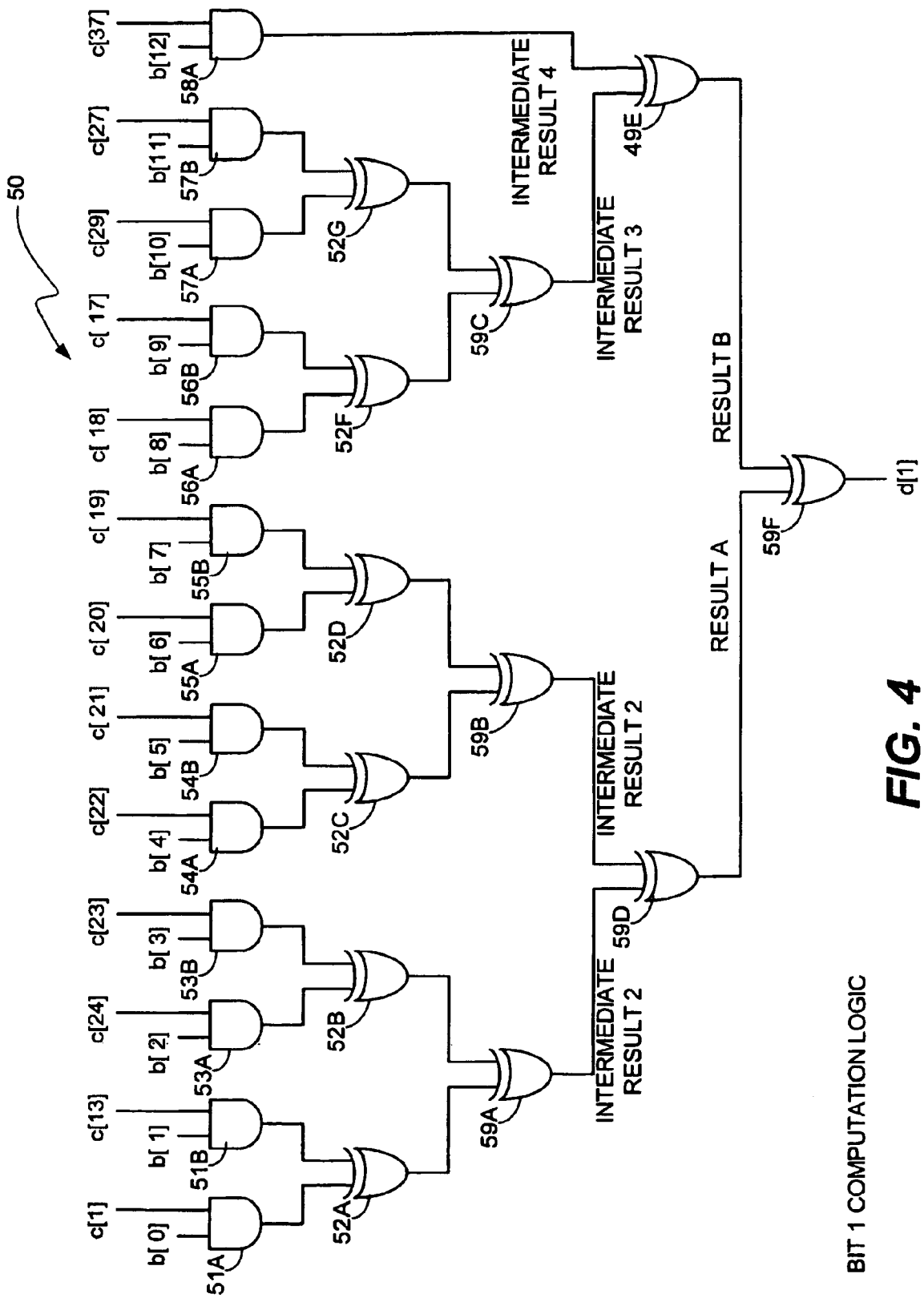
FIG. 4 is a schematic diagram of the binary multiplication and addition logic shown in block diagram form in FIG. 1 for determining bit d[1].

FIG. 4 schematically illustrates the multiplication/addition logic 50 for generating the d[1] term. With reference to FIG. 4, AND gates 51A and 51B multiply bits b[0] and c[1] together and bits b[1] and c[13] together, respectively. The results of these two ANDing operations are then modulo-2 added together by XOR gate 52A. AND gates 53A and 53B multiply bits b[2] and c[24] together and bits b[3] and c[23] together, respectively. The results of these two ANDing operations are then modulo-2 added together by XOR gate 52B. The outputs of XOR gates 52A and 52B are then modulo-2 added together by XOR gate 59A to produce intermediate result 1.

Likewise, AND gates 54A and 54B multiply bits b[4] and c[22] together and bits b[5] and c[21] together, respectively. The results of these two ANDing operations are then modulo-2 added together by XOR gate 52C. AND gates 55A and 55B multiply bits b[6] and c[20] together and bits b[7] and c[19] together, respectively. The results of these two ANDing operations are then modulo-2 added together by XOR gate 52D. The outputs of XOR gates 52C and 52D are then modulo-2 added together by XOR gate 59B to produce intermediate result 2. Intermediate results 1 and 2 are then modulo-2 added together by XOR gate 59D to produce result A.

Likewise, AND gates 56A and 56B multiply bits b[8] and c[18] together and bits b[9] and c[17] together, respectively. The results of these two ANDing operations are then modulo-2 added together by XOR gate 52F. AND gates 57A and 57B multiply bits b[11] and c[27] together and bits b[12] and c[37] together, respectively. The results of these two ANDing operations are then modulo-2 added together by XOR gate 52G. The outputs of XOR gates 52F and 52G are then modulo-2 added together by XOR gate 59C to produce intermediate result 3. Bits b[12] and c[37] are multiplied together by AND gate 58A, and the results of that operation are modulo-2 added to intermediate result 3 by XOR gate 59E to produce result B. Results A and B are then modulo-2 added together by XOR gate 59F to produce term d[1].

Figure 5:
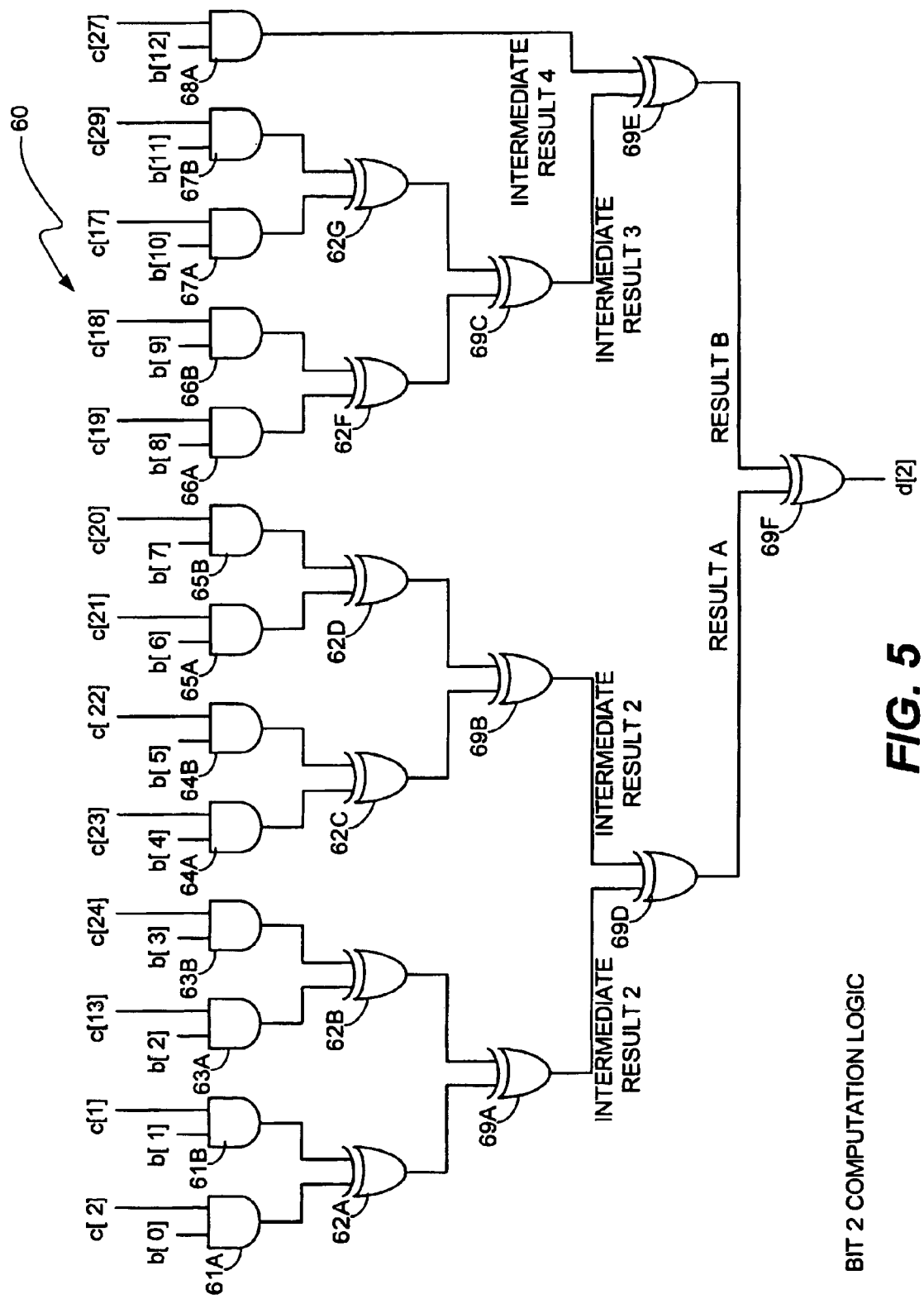
FIG. 5 is a schematic diagram of the binary multiplication and addition logic shown in block diagram form in FIG. 1 for determining bit d[2].

FIG. 5 schematically illustrates the multiplication/addition logic 60 for generating the d[2] term. With reference to FIG. 5, AND gates 61A and 61B multiply bits b[0] and c[2] together and bits b[1] and c[1] together, respectively. The results of these two ANDing operations are then modulo-2 added together by XOR gate 62A. AND gates 63A and 63B multiply bits b[2] and c[13] together and bits b[3] and c[24] together, respectively. The results of these two ANDing operations are then modulo-2 added together by XOR gate 62B. The outputs of XOR gates 62A and 62B are then modulo-2 added together by XOR gate 69A to produce intermediate result 1.

Likewise, AND gates 64A and 64B multiply bits b[4] and c[23] together and bits b[5] and c[22] together, respectively. The results of these two ANDing operations are then modulo-2 added together by XOR gate 62C. AND gates 65A and 65B multiply bits b[6] and c[21] together and bits b[7] and c[20] together, respectively. The results of these two ANDing operations are then modulo-2 added together by XOR gate 62D. The outputs of XOR gates 62C and 62D are then modulo-2 added together by XOR gate 69B to produce intermediate result 2. Intermediate results 1 and 2 are then modulo-2 added together by XOR gate 69D to produce result A.

Likewise, AND gates 66A and 66B multiply bits b[8] and c[19] together and bits b[9] and c[18] together, respectively. The results of these two ANDing operations are then modulo-2 added together by XOR gate 62F. AND gates 67A and 67B multiply bits b[11] and c[29] together and bits b[12] and c[27] together, respectively. The results of these two ANDing operations are then modulo-2 added together by XOR gate 62G. The outputs of XOR gates 62F and 62G are then modulo-2 added together by XOR gate 69C to produce intermediate result 3. Bits b[12] and c[27] are multiplied together by AND gate 68A, and the results of that operation are modulo-2 added to intermediate result 3 by XOR gate 69E to produce result B. Results A and B are then modulo-2 added together by XOR gate 69F to produce term d[2].

Figure 6:
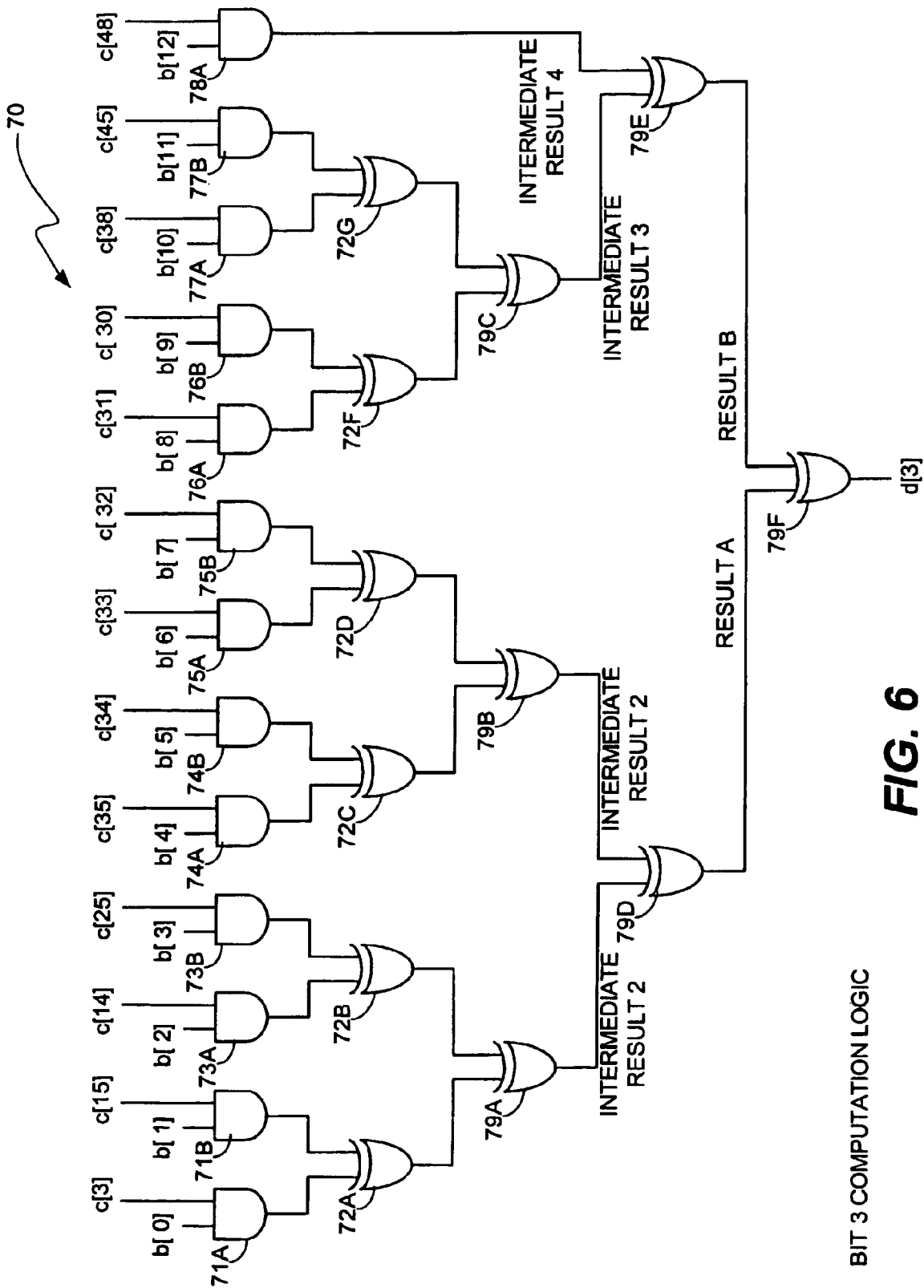
FIG. 6 is a schematic diagram of the binary multiplication and addition logic shown in block diagram form in FIG. 1 for determining bit d[3].

FIG. 6 schematically illustrates the multiplication/addition logic 70 for generating the d[3] term. With reference to FIG. 6, AND gates 71A and 71B multiply bits b[0] and c[3]

together and bits b[1] and c[15] together, respectively. The results of these two ANDing operations are then modulo-2 added together by XOR gate 72A. AND gates 73A and 73B multiply bits b[2] and c[14] together and bits b[3] and c[25] together, respectively. The results of these two ANDing operations are then modulo-2 added together by XOR gate 72B. The outputs of XOR gates 72A and 72B are then modulo-2 added together by XOR gate 79A to produce intermediate result 1.

Likewise, AND gates 74A and 74B multiply bits b[4] and c[35] together and bits b[5] and c[34] together, respectively. The results of these two ANDing operations are then modulo-2 added together by XOR gate 72C. AND gates 75A and 75B multiply bits b[6] and c[33] together and bits b[7] and c[32] together, respectively. The results of these two ANDing operations are then modulo-2 added together by XOR gate 72D. The outputs of XOR gates 72C and 72D are then modulo-2 added together by XOR gate 79B to produce intermediate result 2. Intermediate results 1 and 2 are then modulo-2 added together by XOR gate 79D to produce result A.

Likewise, AND gates 76A and 76B multiply bits b[8] and c[31] together and bits b[9] and c[30] together, respectively. The results of these two ANDing operations are then modulo-2 added together by XOR gate 72F. AND gates 77A and 77B multiply bits b[11] and c[45] together and bits b[12] and c[48] together, respectively. The results of these two ANDing operations are then modulo-2 added together by XOR gate 72G. The outputs of XOR gates 72F and 72G are then modulo-2 added together by XOR gate 79C to produce intermediate result 3. Bits b[12] and c[48] are multiplied together by AND gate 78A, and the results of that operation are modulo-2 added to intermediate result 3 by XOR gate 79E to produce result B. Results A and B are then modulo-2 added together by XOR gate 79F to produce term d[3].

Figure 7:
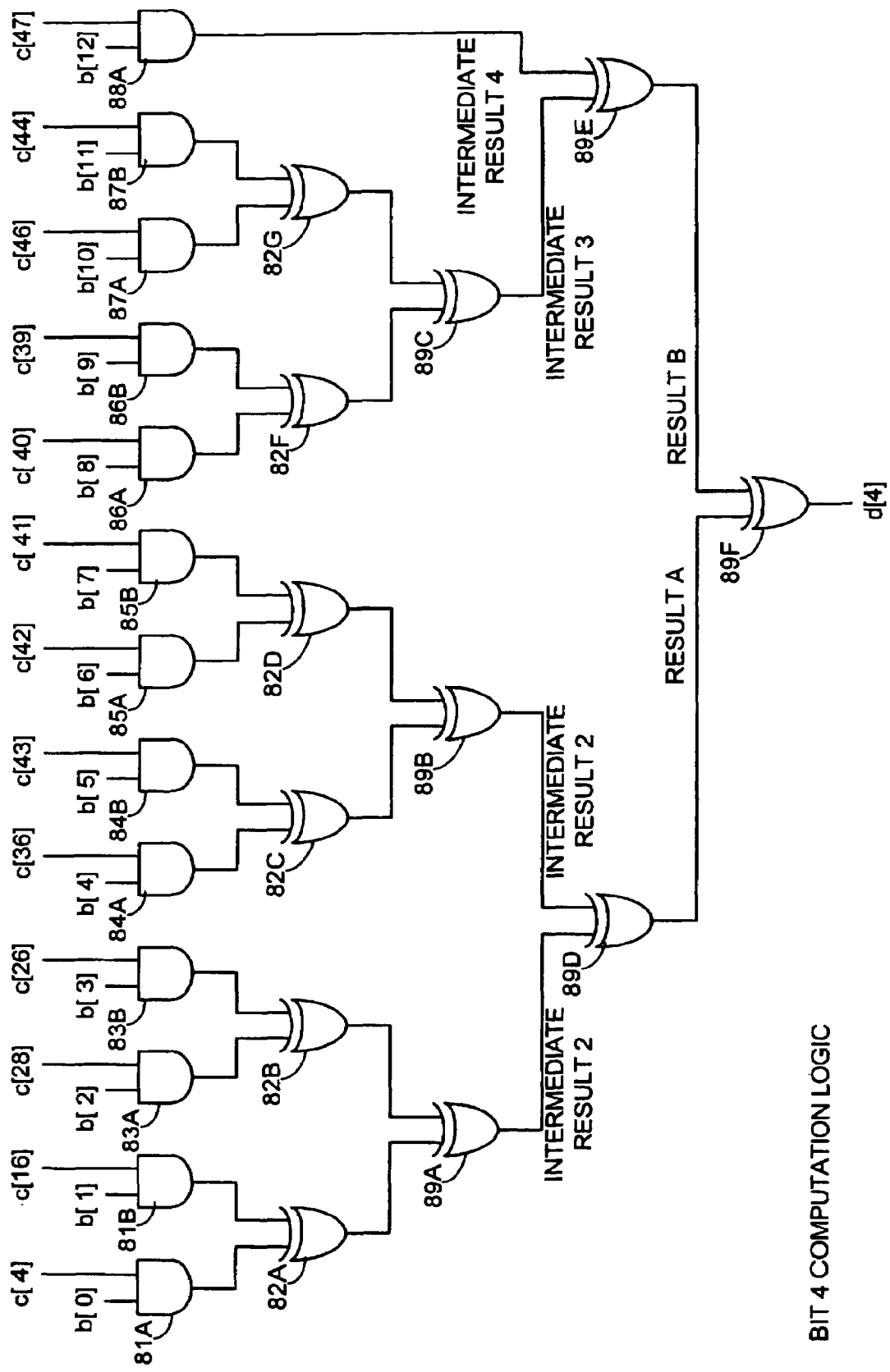
FIG. 7 is a schematic diagram of the binary multiplication and addition logic shown in block diagram form in FIG. 1 for determining bit d[4].

FIG. 7 schematically illustrates the multiplication/addition logic 80 for generating the d[4] term. With reference to FIG. 7, AND gates 81A and 81B multiply bits b[0] and c[4] together and bits b[1] and c[16] together, respectively. The results of these two ANDing operations are then modulo-2 added together by XOR gate 82A. AND gates 83A and 83B multiply bits b[2] and c[28] together and bits b[3] and c[26] together, respectively. The results of these two ANDing operations are then modulo-2 added together by XOR gate 82B. The outputs of XOR gates 82A and 82B are then modulo-2 added together by XOR gate 89A to produce intermediate result 1.

Likewise, AND gates 84A and 84B multiply bits b[4] and c[36] together and bits b[5] and c[43] together, respectively. The results of these two ANDing operations are then modulo-2 added together by XOR gate 82C. AND gates 85A and 85B multiply bits b[6] and c[42] together and bits b[7] and c[41] together, respectively. The results of these two ANDing operations are then modulo-2 added together by XOR gate 82D. The outputs of XOR gates 82C and 82D are then modulo-2 added together by XOR gate 89B to produce intermediate result 2. Intermediate results 1 and 2 are then modulo-2 added together by XOR gate 89D to produce result A.

Likewise, AND gates 86A and 86B multiply bits b[8] and c[40] together and bits b[9] and c[39] together, respectively. The results of these two ANDing operations are then modulo-2 added together by XOR gate 82F. AND gates 87A and 87B multiply bits b[11] and c[44] together and bits b[12] and c[47] together, respectively. The results of these two ANDing operations are then modulo-2 added together by XOR gate 82G. The outputs of XOR gates 82F and 82G are then modulo-2 added together by XOR gate 89C to produce intermediate result 3. Bits b[12] and c[47] are multiplied together by AND gate 88A, and the results of that operation are modulo-2 added to intermediate result 3 by XOR gate 89E to produce result B. Results A and B are then modulo-2 added together by XOR gate 89F to produce term d[4].

Figure 8:
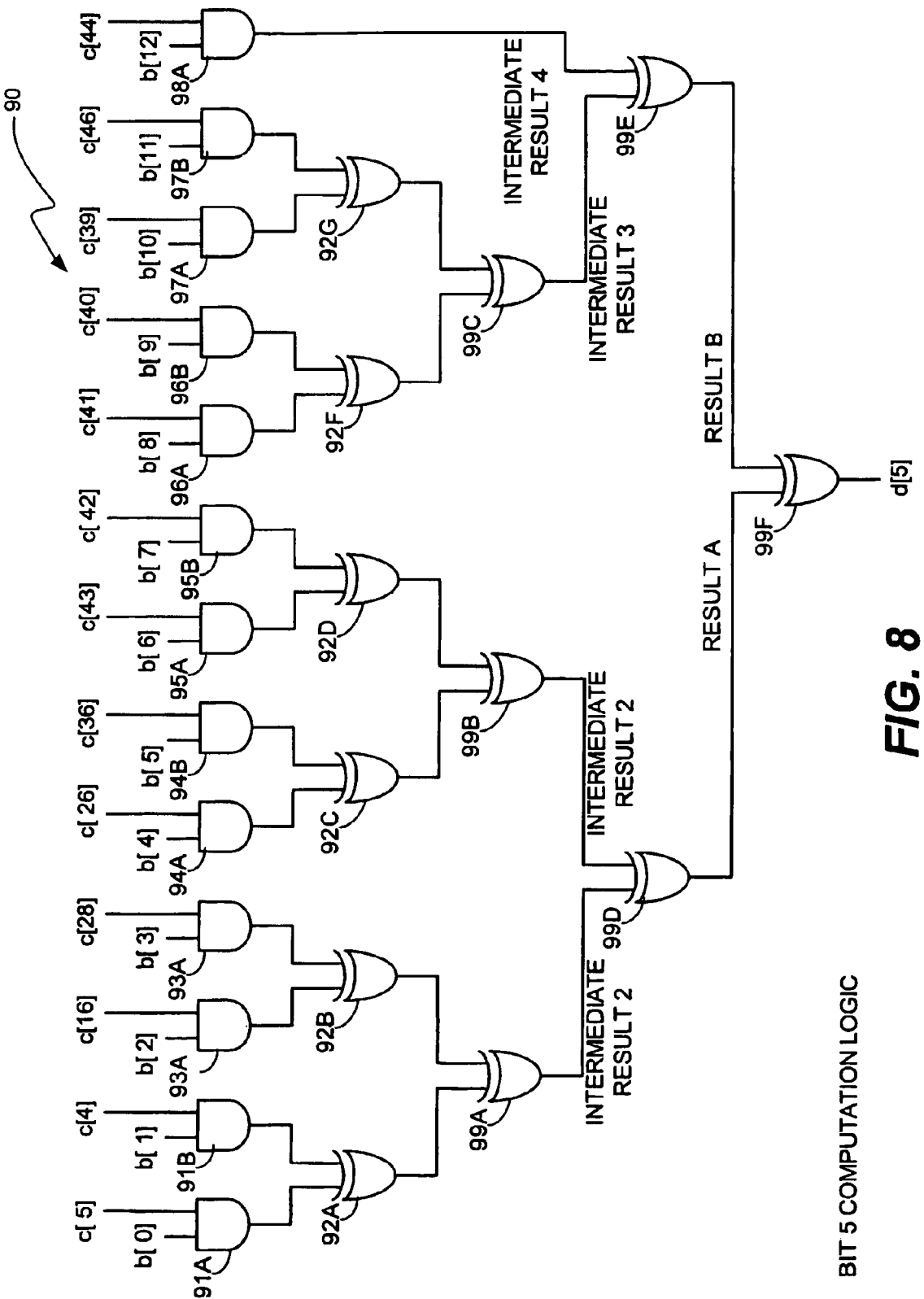
FIG. 8 is a schematic diagram of the binary multiplication and addition logic shown in block diagram form in FIG. 1 for determining bit d[5].

FIG. 8 schematically illustrates the multiplication/addition logic 90 for generating the d[5] term. With reference to FIG. 8, AND gates 91A and 91B multiply bits b[0] and c[5] together and bits b[1] and c[4] together, respectively. The results of these two ANDing operations are then modulo-2 added together by XOR gate 92A. AND gates 93A and 93B multiply bits b[2] and c[16] together and bits b[3] and c[28] together, respectively. The results of these two ANDing operations are then modulo-2 added together by XOR gate 92B. The outputs of XOR gates 92A and 92B are then modulo-2 added together by XOR gate 99A to produce intermediate result 1.

Likewise, AND gates 94A and 94B multiply bits b[4] and c[26] together and bits b[5] and c[36] together, respectively. The results of these two ANDing operations are then modulo-2 added together by XOR gate 92C. AND gates 95A and 95B multiply bits b[6] and c[43] together and bits b[7] and c[42] together, respectively. The results of these two ANDing operations are then modulo-2 added together by XOR gate 92D. The outputs of XOR gates 92C and 92D are then modulo-2 added together by XOR gate 99B to produce intermediate result 2. Intermediate results 1 and 2 are then modulo-2 added together by XOR gate 99D to produce result A.

Likewise, AND gates 96A and 96B multiply bits b[8] and c[41] together and bits b[9] and c[40] together, respectively. The results of these two ANDing operations are then modulo-2 added together by XOR gate 92F. AND gates 97A and 97B multiply bits b[11] and c[46] together and bits b[12] and c[44] together, respectively. The results of these two ANDing operations are then modulo-2 added together by XOR gate 92G. The outputs of XOR gates 92F and 92G are then modulo-2 added together by XOR gate 99C to produce intermediate result 3. Bits b[12] and c[44] are multiplied together by AND gate 98A, and the results of that operation are modulo-2 added to intermediate result 3 by XOR gate 99E to produce result B. Results A and B are then modulo-2 added together by XOR gate 99F to produce term d[5].

Figure 9:
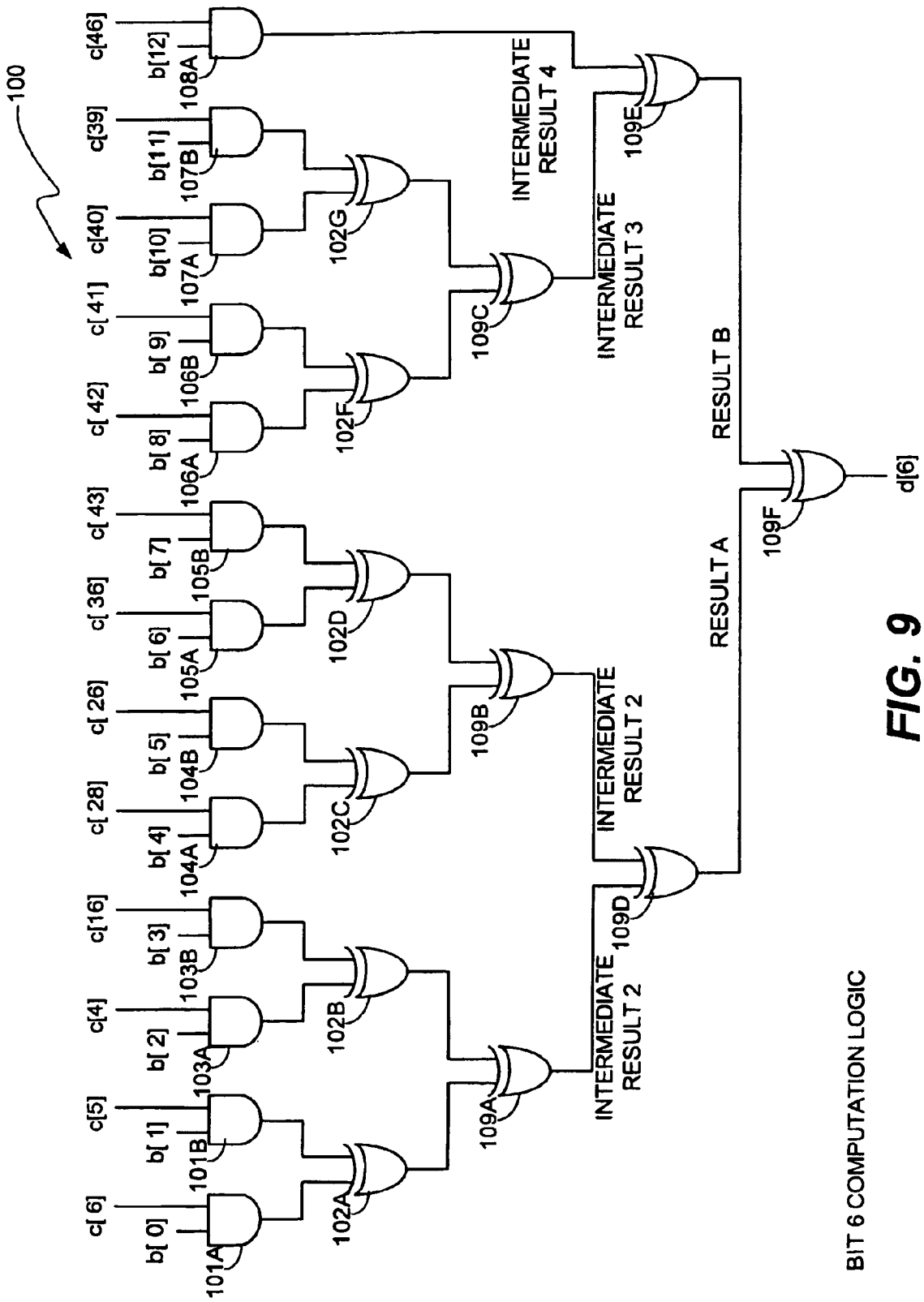
FIG. 9 is a schematic diagram of the binary multiplication and addition logic shown in block diagram form in FIG. 1 for determining bit d[6].

FIG. 9 schematically illustrates the multiplication/addition logic 100 for generating the d[6] term. With reference to FIG. 9, AND gates 110A and 110B multiply bits b[0] and c[6] together and bits b[1] and c[5] together, respectively. The results of these two ANDing operations are then modulo-2 added together by XOR gate 102A. AND gates 103A and 103B multiply bits b[2] and c[4] together and bits b[3] and c[16] together, respectively. The results of these two ANDing operations are then modulo-2 added together by XOR gate 102B. The outputs of XOR gates 102A and 102B are then modulo-2 added together by XOR gate 109A to produce intermediate result 1.

Likewise, AND gates 104A and 104B multiply bits b[4] and c[28] together and bits b[5] and c[26] together, respectively. The results of these two ANDing operations are then modulo-2 added together by XOR gate 102C. AND gates 105A and 105B multiply bits b[6] and c[36] together and bits b[7] and c[43] together, respectively. The results of these two ANDing operations are then modulo-2 added together by XOR gate 102D. The outputs of XOR gates 102C and 102D are then modulo-2 added together by XOR gate 109B to produce intermediate result 2. Intermediate results 1 and 2 are then modulo-2 added together by XOR gate 109D to produce result A.

Likewise, AND gates 106A and 106B multiply bits b[8] and c[42] together and bits b[9] and c[41] together, respectively. The results of these two ANDing operations are then modulo-2 added together by XOR gate 102F. AND gates 107A and 107B multiply bits b[11] and c[39] together and bits b[12] and c[46] together, respectively. The results of these two ANDing operations are then modulo-2 added together by XOR gate 1022G. The outputs of XOR gates 102F and 102G are then modulo-2 added together by XOR gate 109C to produce intermediate result 3. Bits b[12] and c[46] are multiplied together by AND gate 108A, and the results of that operation are modulo-2 added to intermediate result 3 by XOR gate 109E to produce result B. Results A and B are then modulo-2 added together by XOR gate 109F to produce term d[6].

Figure 10:
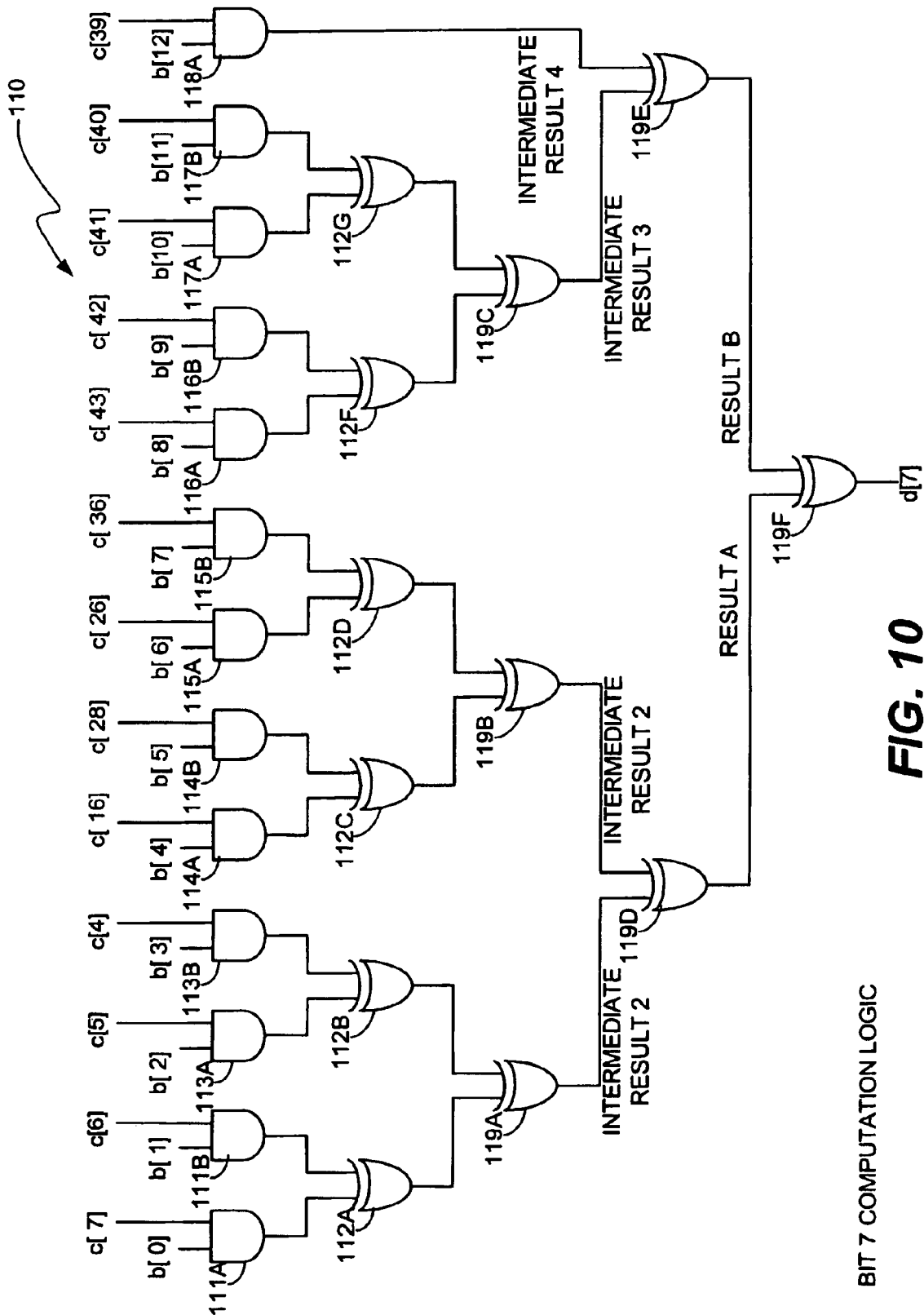
FIG. 10 is a schematic diagram of the binary multiplication and addition logic shown in block diagram form in FIG. 1 for determining bit d[7].

FIG. 10 schematically illustrates the multiplication/addition logic 110 for generating the d[7] term. With reference to FIG. 10, AND gates 111A and 111B multiply bits b[0] and c[7] together and bits b[1] and c[6] together, respectively. The results of these two ANDing operations are then modulo-2 added together by XOR gate 112A. AND gates 113A and 113B multiply bits b[2] and c[5] together and bits b[3] and c[4] together, respectively. The results of these two ANDing operations are then modulo-2 added together by XOR gate 112B. The outputs of XOR gates 112A and 112B are then modulo-2 added together by XOR gate 119A to produce intermediate result 1.

Likewise, AND gates 114A and 114B multiply bits b[4] and c[16] together and bits b[5] and c[28] together, respectively. The results of these two ANDing operations are then modulo-2 added together by XOR gate 112C. AND gates 115A and 115B multiply bits b[6] and c[26] together and bits b[7] and c[36] together, respectively. The results of these two ANDing operations are then modulo-2 added together by XOR gate 112D. The outputs of XOR gates 112C and 112D are then modulo-2 added together by XOR gate 119B to produce intermediate result 2. Intermediate results 1 and 2 are then modulo-2 added together by XOR gate 119D to produce result A.

Likewise, AND gates 116A and 116B multiply bits b[8] and c[43] together and bits b[9] and c[42] together, respectively. The results of these two ANDing operations are then modulo-2 added together by XOR gate 112F. AND gates 117A and 117B multiply bits b[11] and c[40] together and bits b[12] and c[39] together, respectively. The results of these two ANDing operations are then modulo-2 added together by XOR gate 112G. The outputs of XOR gates 112F and 112G are then modulo-2 added together by XOR gate 119C to produce intermediate result 3. Bits b[12] and c[46] are multiplied together by AND gate 118A, and the results of that operation are modulo-2 added to intermediate result 3 by XOR gate 119E to produce result B. Results A and B are then modulo-2 added together by XOR gate 119F to produce term d[7].

Figure 11:
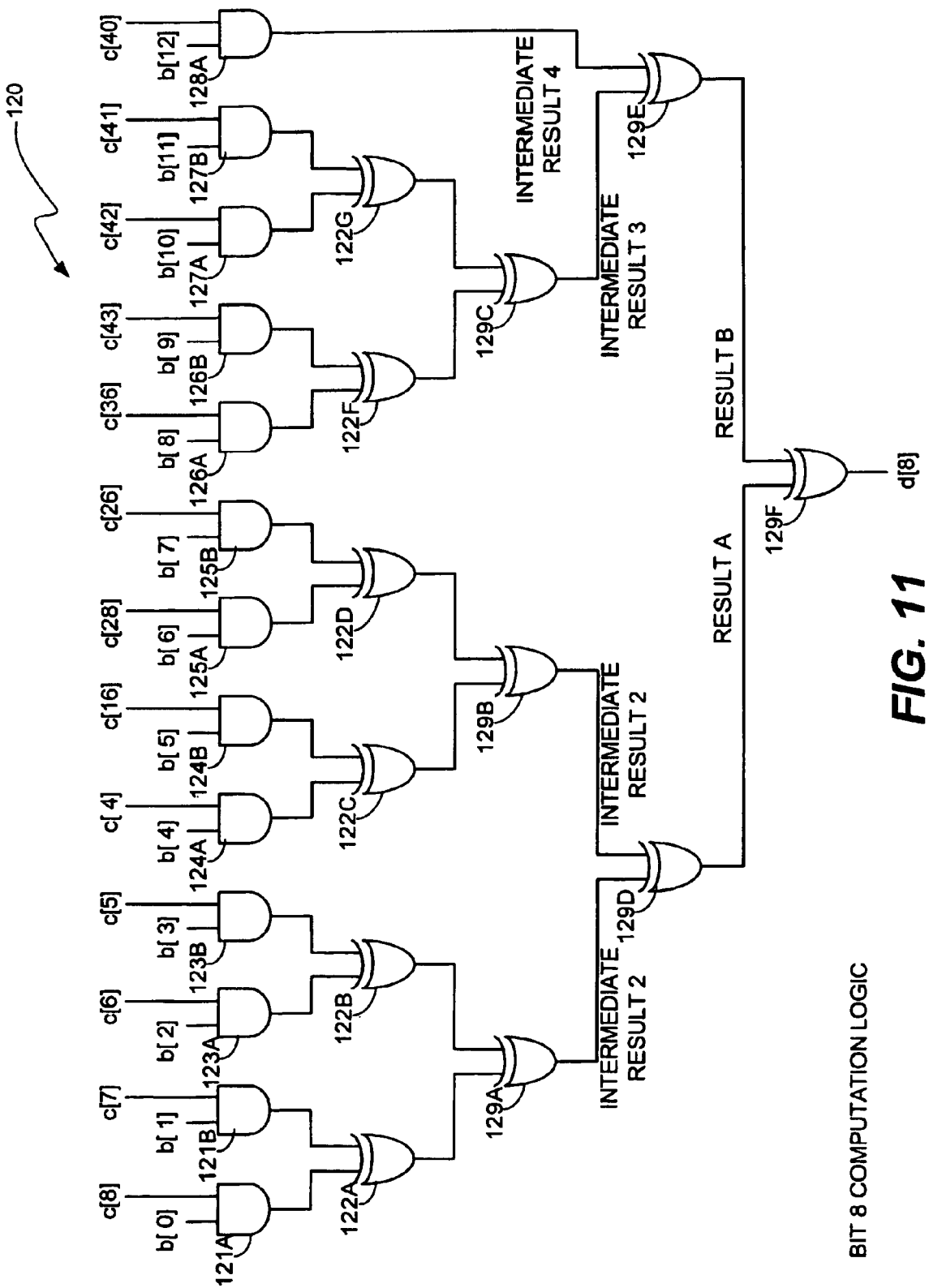
FIG. 11 is a schematic diagram of the binary multiplication and addition logic shown in block diagram form in FIG. 1 for determining bit d[8].

FIG. 11 schematically illustrates the multiplication/addition logic 120 for generating the d[8] term. With reference to FIG. 11, AND gates 121A and 121B multiply bits b[0] and c[8] together and bits b[1] and c[7] together, respectively. The results of these two ANDing operations are then modulo-2 added together by XOR gate 122A. AND gates 123A and 123B multiply bits b[2] and c[6] together and bits b[3] and c[5] together, respectively. The results of these two ANDing operations are then modulo-2 added together by XOR gate 122B. The outputs of XOR gates 122A and 122B are then modulo-2 added together by XOR gate 129A to produce intermediate result 1.

Likewise, AND gates 124A and 124B multiply bits b[4] and c[4] together and bits b[5] and c[16] together, respectively. The results of these two ANDing operations are then modulo-2 added together by XOR gate 122C. AND gates 125A and 125B multiply bits b[6] and c[28] together and bits b[7] and c[26] together, respectively. The results of these two ANDing operations are then modulo-2 added together by XOR gate 122D. The outputs of XOR gates 122C and 122D are then modulo-2 added together by XOR gate 129B to produce intermediate result 2. Intermediate results 1 and 2 are then modulo-2 added together by XOR gate 129D to produce result A.

Likewise, AND gates 126A and 126B multiply bits b[8] and c[36] together and bits b[9] and c[43] together, respectively. The results of these two ANDing operations are then modulo-2 added together by XOR gate 122F. AND gates 127A and 127B multiply bits b[11] and c[41] together and bits b[12] and c[40] together, respectively. The results of these two ANDing operations are then modulo-2 added together by XOR gate 122G. The outputs of XOR gates 122F and 122G are then modulo-2 added together by XOR gate 129C to produce intermediate result 3. Bits b[12] and c[40] are multiplied together by AND gate 128A, and the results of that operation are modulo-2 added to intermediate result 3 by XOR gate 129E to produce result B. Results A and B are then modulo-2 added together by XOR gate 129F to produce term d[8].

Figure 12:
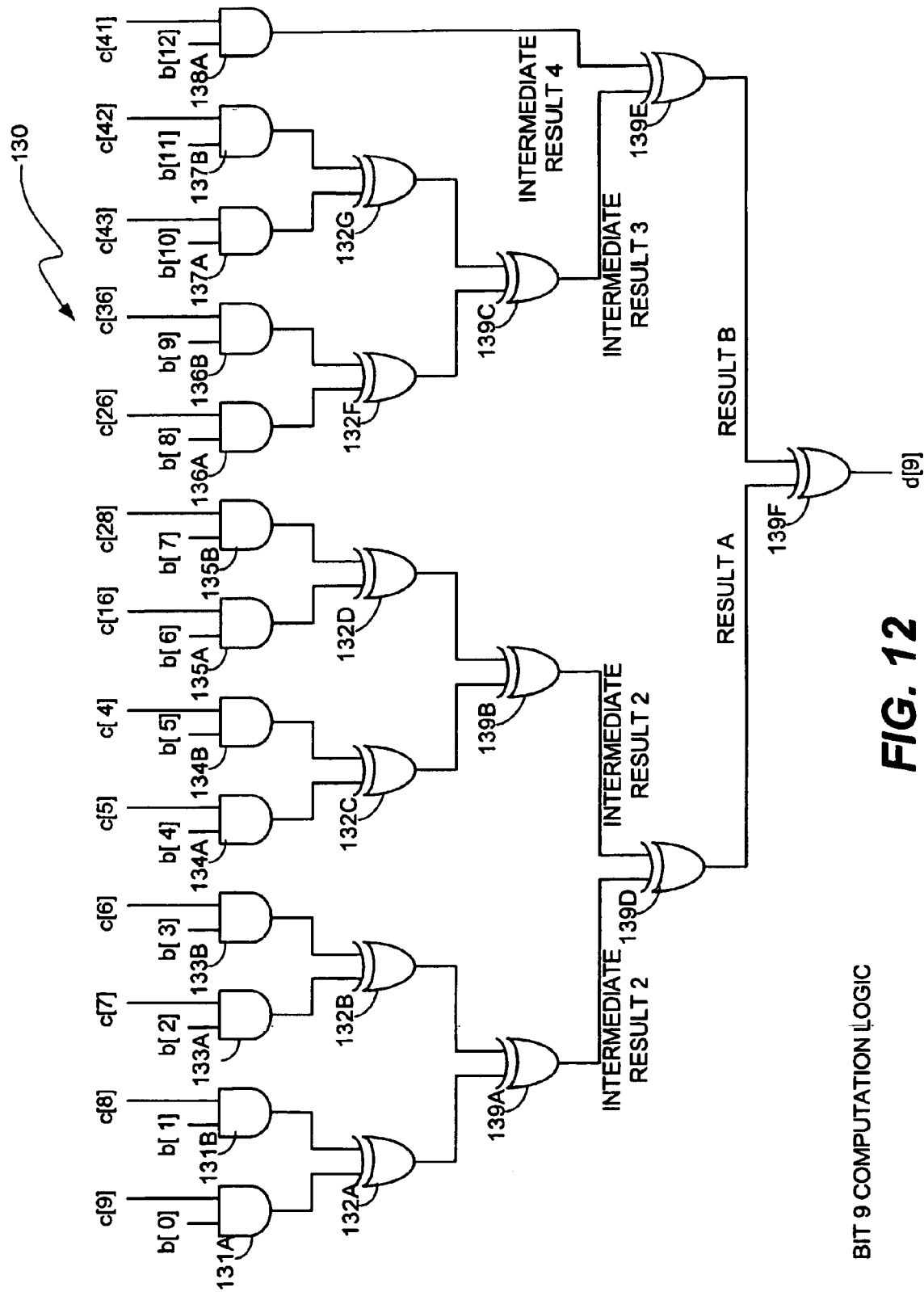
FIG. 12 is a schematic diagram of the binary multiplication and addition logic shown in block diagram form in FIG. 1 for determining bit d[9].

FIG. 12 schematically illustrates the multiplication/addition logic 130 for generating the d[9] term. With reference to FIG. 12, AND gates 131A and 131B multiply bits b[0] and c[9] together and bits b[1] and c[8] together, respectively. The results of these two ANDing operations are then modulo-2 added together by XOR gate 132A. AND gates 133A and 133B multiply bits b[2] and c[7] together and bits b[3] and c[6] together, respectively. The results of these two ANDing operations are then modulo-2 added together by XOR gate 132B. The outputs of XOR gates 132A and 132B are then modulo-2 added together by XOR gate 139A to produce intermediate result 1.

Likewise, AND gates 134A and 134B multiply bits b[4] and c[5] together and bits b[5] and c[4] together, respectively. The results of these two ANDing operations are then modulo-2 added together by XOR gate 132C. AND gates 135A and 135B multiply bits b[6] and c[16] together and bits b[7] and c[28] together, respectively. The results of these two ANDing operations are then modulo-2 added together by XOR gate 132D. The outputs of XOR gates 132C and 132D are then modulo-2 added together by XOR gate 139B to produce intermediate result 2. Intermediate results 1 and 2 are then modulo-2 added together by XOR gate 139D to produce result A.

Likewise, AND gates 136A and 136B multiply bits b[8] and c[26] together and bits b[9] and c[36] together, respectively. The results of these two ANDing operations are then modulo-2 added together by XOR gate 132F. AND gates 137A and 137B multiply bits b[11] and c[42] together and bits b[12] and c[41] together, respectively. The results of these two ANDing operations are then modulo-2 added together by XOR gate 132G. The outputs of XOR gates 132F and 132G are then modulo-2 added together by XOR gate 139C to produce intermediate result 3. Bits b[12] and c[42] are multiplied together by AND gate 138A, and the results of that operation are modulo-2 added to intermediate result 3 by XOR gate 139E to produce result B. Results A and B are then modulo-2 added together by XOR gate 139F to produce term d[9].

Figure 13:
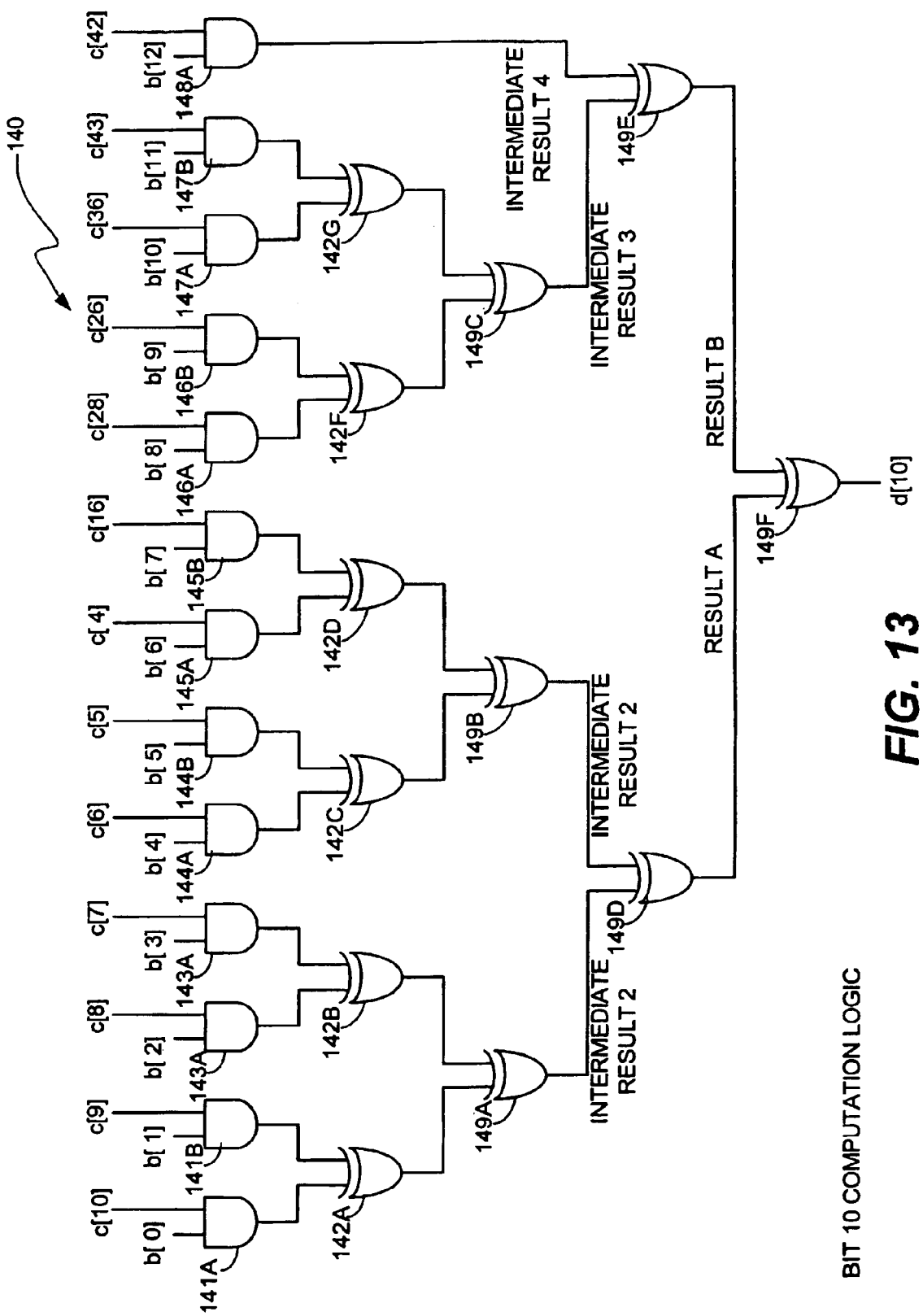
FIG. 13 is a schematic diagram of the binary multiplication and addition logic shown in block diagram form in FIG. 1 for determining bit d[10].

FIG. 13 schematically illustrates the multiplication/addition logic 140 for generating the d[10] term. With reference to FIG. 13, AND gates 141A and 141B multiply bits b[0] and c[10] together and bits b[1] and c[9] together, respectively. The results of these two ANDing operations are then modulo-2 added together by XOR gate 142A. AND gates 143A and 143B multiply bits b[2] and c[8] together and bits b[3] and c[7] together, respectively. The results of these two ANDing operations are then modulo-2 added together by XOR gate 142B. The outputs of XOR gates 142A and 142B are then modulo-2 added together by XOR gate 149A to produce intermediate result 1.

Likewise, AND gates 144A and 144B multiply bits b[4] and c[6] together and bits b[5] and c[5] together, respectively. The results of these two ANDing operations are then modulo-2 added together by XOR gate 142C. AND gates 145A and 145B multiply bits b[6] and c[4] together and bits b[7] and c[16] together, respectively. The results of these two ANDing operations are then modulo-2 added together by XOR gate 142D. The outputs of XOR gates 142C and 142D are then modulo-2 added together by XOR gate 149B to produce intermediate result 2. Intermediate results 1 and 2 are then modulo-2 added together by XOR gate 149D to produce result A.

Likewise, AND gates 146A and 146B multiply bits b[8] and c[28] together and bits b[9] and c[26] together, respectively. The results of these two ANDing operations are then modulo-2 added together by XOR gate 142F. AND gates 147A and 147B multiply bits b[11] and c[43] together and bits b[12] and c[42] together, respectively. The results of these two ANDing operations are then modulo-2 added together by XOR gate 142G. The outputs of XOR gates 142F and 142G are then modulo-2 added together by XOR gate 149C to produce intermediate result 3. Bits b[12] and c[42] are multiplied together by AND gate 148A, and the results of that operation are modulo-2 added to intermediate result 3 by XOR gate 149E to produce result B. Results A and B are then modulo-2 added together by XOR gate 149F to produce term d[10].

Figure 14:
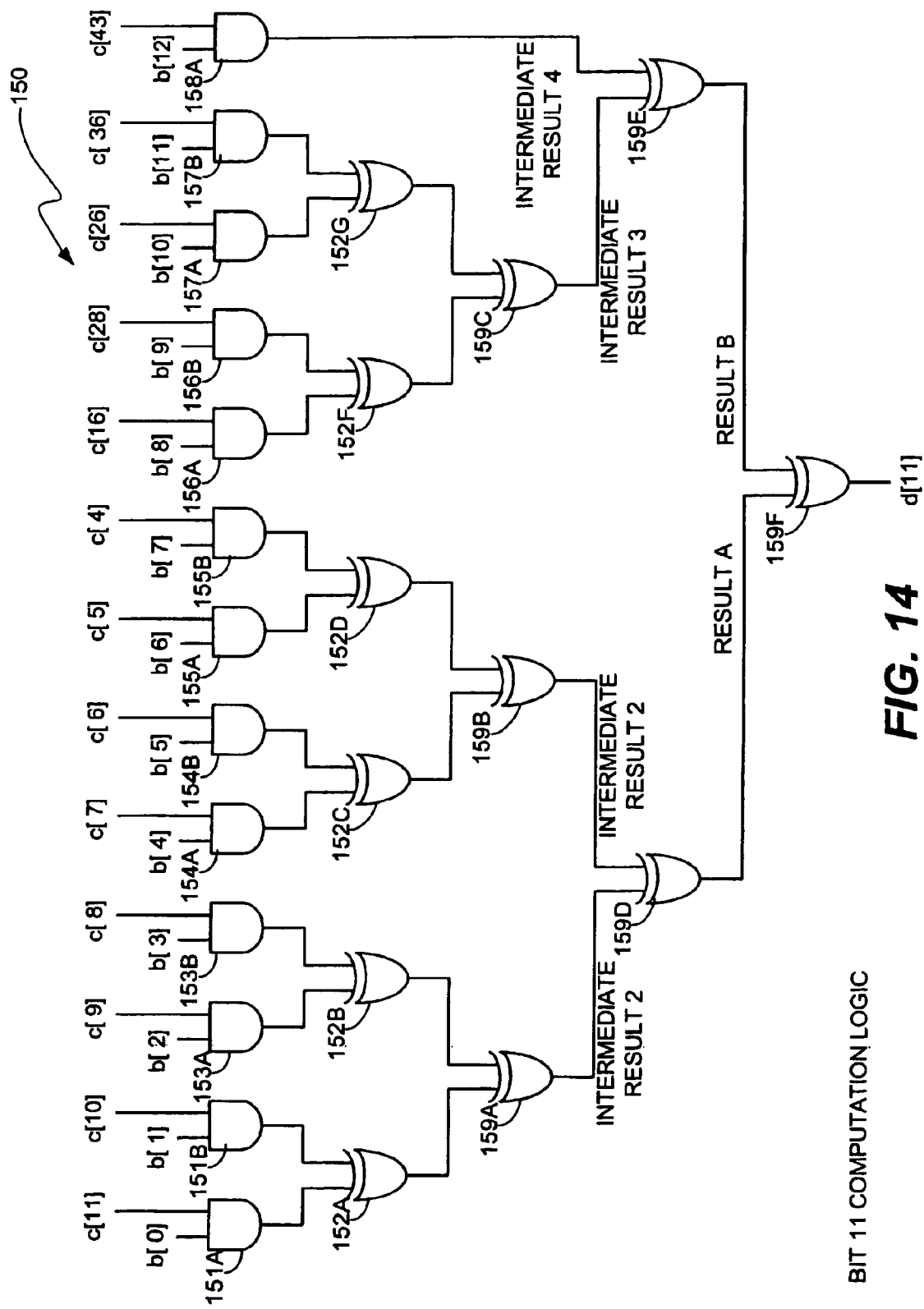
FIG. 14 is a schematic diagram of the binary multiplication and addition logic shown in block diagram form in FIG. 1 for determining bit d[11].

FIG. 14 schematically illustrates the multiplication/addition logic 150 for generating the d[11] term. With reference to FIG. 14, AND gates 151A and 151B multiply bits b[0] and c[11] together and bits b[1] and c[10] together, respectively. The results of these two ANDing operations are then modulo-2 added together by XOR gate 152A. AND gates 153A and 153B multiply bits b[2] and c[9] together and bits b[3] and c[8] together, respectively. The results of these two ANDing operations are then modulo-2 added together by XOR gate 152B. The outputs of XOR gates 152A and 152B are then modulo-2 added together by XOR gate 159A to produce intermediate result 1.

Likewise, AND gates 154A and 154B multiply bits b[4] and c[7] together and bits b[5] and c[6] together, respectively. The results of these two ANDing operations are then modulo-2 added together by XOR gate 152C. AND gates 155A and 155B multiply bits b[6] and c[5] together and bits b[7] and c[4] together, respectively. The results of these two ANDing operations are then modulo-2 added together by XOR gate 152D. The outputs of XOR gates 152C and 152D are then modulo-2 added together by XOR gate 159B to produce intermediate result 2. Intermediate results 1 and 2 are then modulo-2 added together by XOR gate 159D to produce result A.

Likewise, AND gates 156A and 156B multiply bits b[8] and c[16] together and bits b[9] and c[28] together, respectively. The results of these two ANDing operations are then modulo-2, added together by XOR gate 152F. AND gates 157A and 157B multiply bits b[11] and c[36] together and bits b[12] and c[43] together, respectively. The results of these two ANDing operations are then modulo-2 added together by XOR gate 152G. The outputs of XOR gates 152F and 152G are then modulo-2 added together by XOR gate 159C to produce intermediate result 3. Bits b[12] and c[43] are multiplied together by AND gate 158A, and the results of that operation are modulo-2 added to intermediate result 3 by XOR gate 159E to produce result B. Results A and B are then modulo-2 added together by XOR gate 159F to produce term d[11].

Figure 15:
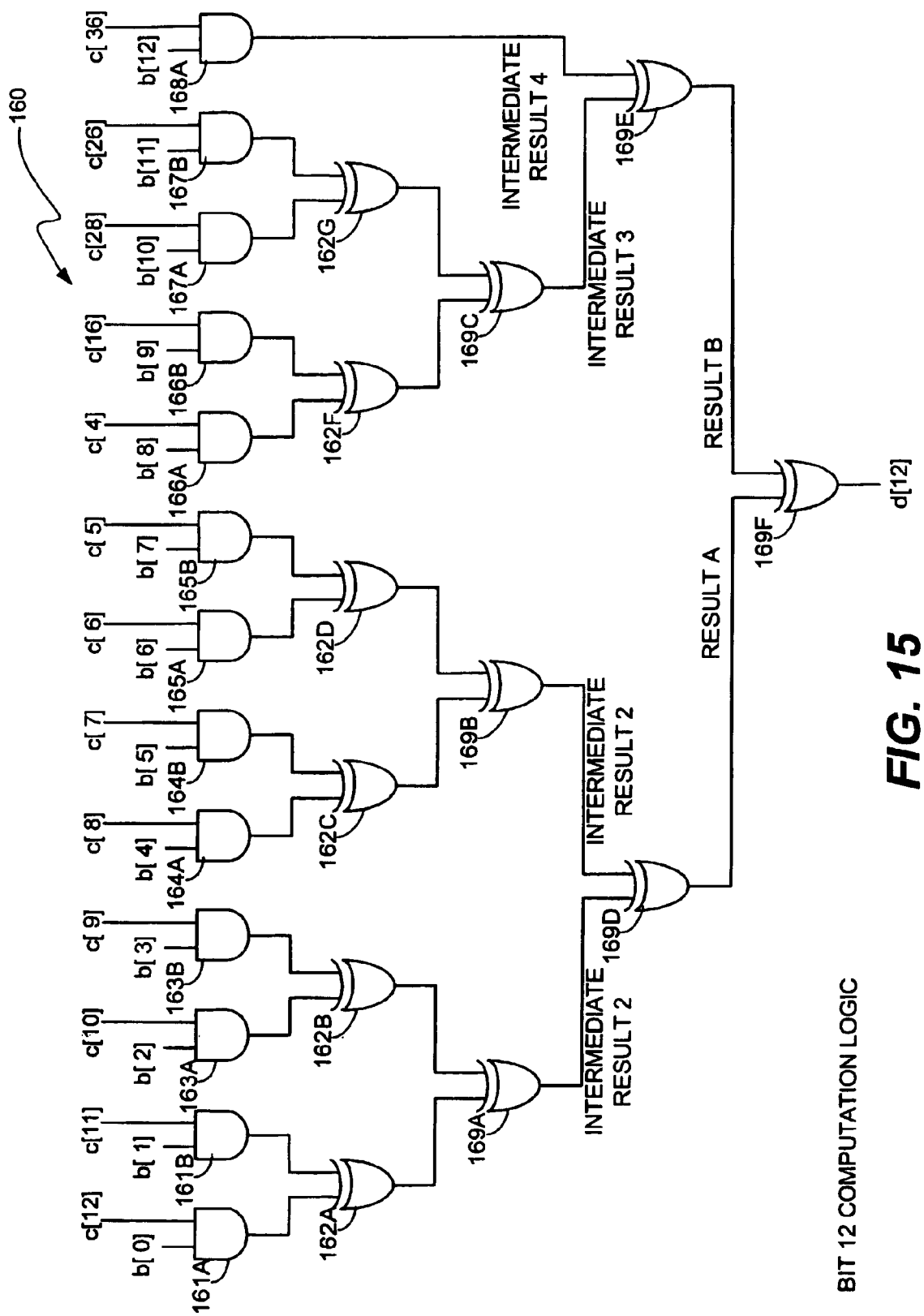
FIG. 15 is a schematic diagram of the binary multiplication and addition logic shown in block diagram form in FIG. 1 for determining bit d[12].

FIG. 15 schematically illustrates the multiplication/addition logic 160 for generating the d[12] term. With reference to FIG. 15, AND gates 161A and 161B multiply bits b[0] and c[11] together and bits b[1] and c[10] together, respectively. The results of these two ANDing operations are then modulo-2 added together by XOR gate 162A. AND gates 163A and 163B multiply bits b[2] and c[9] together and bits b[3] and c[8] together, respectively. The results of these two ANDing operations are then modulo-2 added together by XOR gate 162B. The outputs of XOR gates 162A and 142B are then modulo-2 added together by XOR gate 169A to produce intermediate result 1.

Likewise, AND gates 164A and 164B multiply bits b[4] and c[7] together and bits b[5] and c[6] together, respectively. The results of these two ANDing operations are then modulo-2 added together by XOR gate 162C. AND gates 165A and 165B multiply bits b[6] and c[5] together and bits b[7] and c[4] together, respectively. The results of these two ANDing operations are then modulo-2 added together by XOR gate 162D. The outputs of XOR gates 162C and 162D are then modulo-2 added together by XOR gate 169B to produce intermediate result 2. Intermediate results 1 and 2 are then modulo-2 added together by XOR gate 169D to produce result A.

Likewise, AND gates 166A and 166B multiply bits b[8] and c[16] together and bits b[9] and c[28] together, respectively. The results of these two ANDing operations are then modulo-2 added together by XOR gate 162F. AND gates 167A and 167B multiply bits b[11] and c[36] together and bits b[12] and c[43] together, respectively. The results of these two ANDing operations are then modulo-2 added together by XOR gate 162G. The outputs of XOR gates 162F and 162G are then modulo-2 added together by XOR gate 169C to produce intermediate result 3. Bits b[12] and c[43] are multiplied together by AND gate 168A, and the results of that operation are modulo-2 added to intermediate result 3 by XOR gate 169E to produce result B. Results A and B are then modulo-2 added together by XOR gate 169F to produce term d[12].

This example embodiment of the present invention provides a $GF(2^{13})$ Galois Field Multiplier that is implemented using only 169 2-input AND gates and 195 2-input XOR gates. As stated above, the present invention is not limited to any particular configuration, and is not limited to any particular size Galois field. Also, those skilled in the art will understand that logical operations performed by the AND gates and XOR gates discussed herein can be performed using equivalent logic, such as, for example, NAND gates and XNOR gates.

It should be noted that the present invention has been described with reference to particular embodiments for the purposes of demonstrating the principles and concepts of the present invention. Those skilled in the art will understand that present invention is not limited to these example embodiments. Also, those skilled in the art will understand, in view of the present disclosure, that a variety of logical configurations can be used to achieve the goals of the present invention. It should also be noted that although the present invention has been described herein as being performed in hardware in an ASIC, the present invention may be implemented in hardware, in a combination of hardware and software, in a microprocessor, in a field programmable gate array, etc. Those skilled in the art will understand the way in which the tasks discussed herein can be performed by a variety of such physical implementations. Those skilled in the art will understand that a variety of changes can be made to the configurations described herein and shown in the figures, and that all such modifications are within the scope of the present invention.

What is claimed is:

1. An apparatus for performing Galois field multiplication, the apparatus comprising:
   a premultiplier logic circuit that modulo-2 adds together various $a_n$ terms to produce various $c_r$ terms, the $a_n$ terms corresponding to coefficients of a binary polynomial $A[X]$, the terms $c_r$ corresponding to intermediate values used in the computation of $D[X]$; and
   a plurality of binary multiplication and addition logic circuits that operate in parallel and independently on the $c_r$ terms and $b_n$ terms to produce $d_n$ terms, the $b_n$ terms corresponding to coefficients of a binary polynomial $B[X]$, the $d_n$ terms corresponding to the coefficients of a binary polynomial $D[X]$, and wherein the $d_n$ terms are the output of the Galois field multiplier, and wherein utilization of the premultiplier logic circuits reduce the amount of said binary multiplication and addition logic needed to produce the $d_n$ terms.

2. The apparatus of claim 1, wherein the Galois field multiplier is used in a forward error correction (FEC) system.

3. The apparatus of claim 1, wherein in the binary multiplication and addition logic circuits multiply each of the $b_n$ terms by a respective $c_r$ term, and add results of multiple multiplication operations together to produce $d_n$ terms.

4. The apparatus of claim 1, wherein the multiplication and addition logic circuits include AND gates for ANDing $b_n$ terms with $c_r$ terms and XOR gates for XORing outputs of the AND gates.

5. The apparatus of claim 1, wherein the premultiplier logic circuit comprises a plurality of XOR gates that modulo-2 adds together said various $a_n$ terms to produce said various $c_r$ terms.

6. The apparatus of claim 1, wherein the multiplication and addition logic circuits include NAND gates for NANDing $b_n$ terms with $c_r$ terms and XNOR gates for XNORing outputs of the NAND gates.

7. The apparatus of claim 1, wherein the premultiplier logic circuit comprises a plurality of XNOR gates that modulo-2 adds together said various $a_n$ terms to produce said various $c_r$ terms.

8. The apparatus of claim 1, wherein the apparatus is a $GF(2^{13})$ Galois field multiplier having two Galois Field elements in $GF(2^{13})$ that correspond to the binary polynomials $A[X]$ and $B[X]$ defined as follows:

$$A[X]\ a_{12}X^{12}+a_{11}X^{11}+a_{10}X^{10}+a_9X^9+a_8X^8+a_7X^7+a_6X^6+a_5X^5+a_4X^4+a_3X^3+a_2X^2+a_1X^1+a_0$$

$$B[X]=b_{12}X^{12}+b_{11}X^{11}+b_{10}X^{10}+b_9X^9+b_8X^8+b_7X^7+b_6X^6+b_5X^5+b_4X^4+b_3X^3+b_2X^2+b_1X^1+b_0$$

and wherein multiplication of the elements A and B in $GF(2^{13})$ is defined by an equation for the binary polynomial $D[X]$:

$D[X]=A[X]*B[X]$ modulo$(X^{13}+X^4+X^3+X+1)$, and wherein the premultiplier logic circuit translates the binary polynomial $A[X]$ into the binary vector $c_r$, such that the each coefficient of the binary polynomial $D[X]$ is computed by multiplying (ANDing) the appropriate values of $c_r$ by the coefficients of $B[X]$ and summing (XORing) the resulting values.

9. The apparatus of claim 8, wherein the Galois field multiplier is utilized in a forward error correction (FEC) system.

10. The apparatus of claim 2, wherein the FEC system utilizes block coding.

11. The apparatus of claim 10, wherein the block coding is Bose-Chaudhuri-Hocquenghem (BCH) block coding.

12. An apparatus for performing Galois field multiplication with a Galois field multiplier, the Galois field multiplier having two Galois Field elements in a field of $GF(2^n)$ that correspond to the binary polynomials $A[X]$ and $B[X]$ defined as follows:

$$A[X]=a_{n-1}X^{n-1}+a_{n-2}X^{n-2}+a_{n-3}X^{n-3}+X^{n-3}\ldots a_1X+a_0,$$

$$B[X]=b_{n-1}X^{n-1}+b_{n-2}X^{n-2}+b_{n-3}X^{n-3}+\ldots b_1X+b_0,$$

where n corresponds to a number of terms in a Galois extension field of the Galois multiplier, n−1 is an order of the polynomial $A[X]$, and wherein the apparatus comprises:
   premultiplier logic circuit that translates the binary polynomial $A[X]$ into a binary into the binary vector $c_r$, where r is the number of terms in the $c_r$ vector, the premultiplier logic being configured to modulo-2 add together various ones of the $a_0$ through $a_{n-1}$ coefficients to produce various $c_0$ through $c_{r-1}$ terms; and
   a plurality of binary multiplication and addition logic circuits that operate in parallel and independently on the $c_0$ through $c_{r-1}$ terms and the $b_0$ through $b_{n-1}$ coefficients to produce $d_0$ through $d_n$ coefficients of a binary polynomial $D[X]$, and wherein the coefficients $d_0$ through $d_n$ are the output of the Galois field multiplier, and wherein utilization of the premultiplier logic circuits reduce the amount of said binary multiplication and addition logic needed to produce the coefficients $d_0$ through $d_n$ of the binary polynomial $D[X]$.

13. A method for performing Galois field multiplication with a Galois field multiplier having two Galois field elements in a Galois extension field of $GF(2^n)$ in a forward error correction system, the two Galois field elements corresponding to binary polynomials $A[X]$ and $B[X]$, $A[X]$ and $B[X]$ being defined as follows:

$$A[X]=a_{n-1}X^{n-1}+a_{n-2}X^{n-2}+a_{n-3}X^{n-3}+X^{n-3}\ldots a_1X+a_0,$$

$$B[X]=b_{n-1}X^{n-1}+b_{n-2}X^{n-2}+b_{n-3}X^{n-3}+\ldots b_1X+b_0,$$

where n corresponds to a number of terms in the Galois extension field, n−1 is an order of the polynomial $A[X]$, and wherein the method comprises the steps of:
   providing premultiplier logic circuit that translates the binary polynomial $A[X]$ into a binary vector $c_r$, where r corresponds to a number of terms in the $c_r$ vector, the premultiplier logic circuit being configured to modulo-2 add together various ones of the $a_0$ through $a_{n-1}$ coefficients to produce a vector $c_r$ having terms $c_0$ through $c_{r-1}$; and providing a plurality of binary multiplication and addition logic circuits that operate in parallel and independently on the $c_0$ through $c_{r-1}$ terms and the $b_0$ through $b_{n-1}$ coefficients to produce $d_0$ through $d_n$ coefficients of a binary polynomial D[X], and wherein the coefficients $d_0$ through $d_n$ are the output of the Galois field multiplier, and wherein utilization of the premultiplier logic circuits reduce the amount of said binary multiplication and addition logic needed to produce the coefficients $d_0$ through $d_n$ of the binary polynomial D[X].

14. The method of claim 13, wherein the binary multiplication and addition logic circuits multiply each of the $b_n$ terms by a respective $c'_r$ term, and add results of multiple multiplication operations together to produce $d_n$ terms.

15. The method of claim 13, wherein the multiplication and addition logic circuits include AND gates for ANDing $b_n$ terms with $c_r$ term and XOR gates for XORing outputs of the AND gates.

16. The method of claim 13, wherein the premultiplier logic circuit comprises a plurality of XOR gates that modulo-2 adds together said various an terms to produce said various $c_r$ term.

17. The method of claim 13, wherein the multiplication and addition logic circuits include NAND gates for NANDing $b_n$ terms with $c_r$ terms and XNOR gates for XNORing outputs of the NAND gates.

18. The method of claim 13, wherein the premultiplier logic circuit comprises a plurality of XNOR gates that modulo-2 adds together said various an terms to produce said various $c_r$ terms.

19. A computer program for performing Galois field multiplication with a Galois field multiplier having two Galois field elements in a Galois extension field of $GF(2^n)$ in a forward error correction system, the two Galois field elements corresponding to binary polynomials A[X] and B[X], A[X] and B[X] being defined as follows:

$$A[X] = a_{n-1}X^{n-1} + a_{n-2}X^{n-2} + a_{n-3}X^{n-3} + X^{n-3} \ldots a_1X + a_0,$$

$$B[X] = b_{n-1}X^{n-1} + b_{n-2}X^{n-2} + b_{n-3}X^{n-3} + \ldots b_1X + b_0,$$

where n corresponds to a number of terms in the Galois extension field, n−1 is an order of the polynomial A[X], and the computer program being embodied on a computer readable-medium, the program comprising:

a first code segment for translating the binary polynomial A[X] into a vector $c_r$, the first code segment modulo-2 adding together various coefficients of the $a_0$ through $a_{n-1}$ coefficients to produce $c_0$ through $c_{r-1}$ terms of the $c_r$ vector, where r corresponds to a number of terms in the $c_r$ vector; and a second code segment for performing binary multiplication and addition, the second code segment instructing a plurality of binary multiplication and addition logic circuits operating in parallel and independently on the $c_0$ through $C_{r-1}$ terms and the $b_0$ through $b_{n-1}$ coefficients to produce $d_0$ through $d_n$ coefficients of a binary polynomial D[X], and wherein the coefficients $d_0$ through $d_n$ are the output of the Galois field multiplier.

* * * * *